April 28, 1942.   J. M. McDONNELL   2,280,924
STATISTICAL MACHINE
Filed Sept. 25, 1937   21 Sheets-Sheet 1

INVENTOR
JOSEPH M. MC DONNELL
BY *W. C. Sparks*
ATTORNEY

April 28, 1942.　　J. M. McDONNELL　　2,280,924
STATISTICAL MACHINE
Filed Sept. 25, 1937　　21 Sheets-Sheet 2
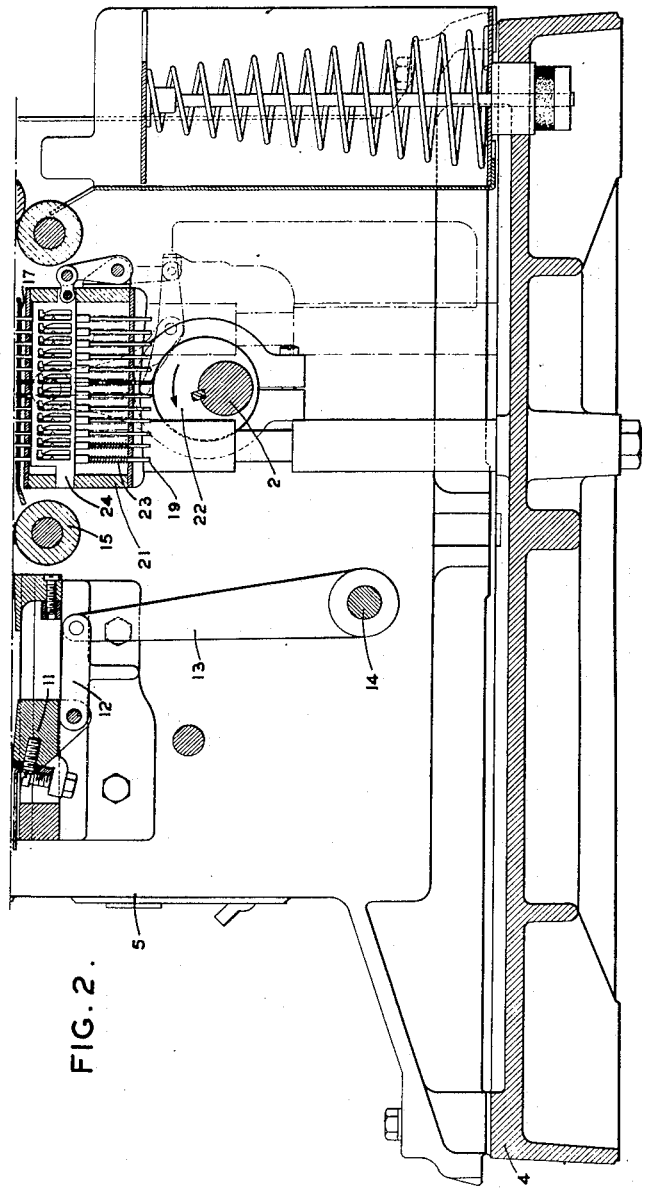
FIG. 2.
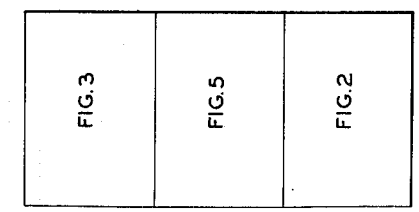
INVENTOR
JOSEPH M. McDONNELL
BY *W. A. Sparks*
ATTORNEY April 28, 1942.　　J. M. McDONNELL　　2,280,924
STATISTICAL MACHINE
Filed Sept. 25, 1937　　21 Sheets-Sheet 3

INVENTOR
JOSEPH M. McDONNELL
BY　　W. A. Sparks
ATTORNEY

April 28, 1942.　　J. M. McDONNELL　　2,280,924
STATISTICAL MACHINE
Filed Sept. 25, 1937　　21 Sheets-Sheet 5

INVENTOR
JOSEPH M. MCDONNELL
BY　H. A. Sparks
ATTORNEY

April 28, 1942.    J. M. McDONNELL    2,280,924
STATISTICAL MACHINE
Filed Sept. 25, 1937    21 Sheets-Sheet 6

INVENTOR
JOSEPH M. McDONNELL
BY *H. A. Sparks*
ATTORNEY

April 28, 1942.　　J. M. McDONNELL　　2,280,924
STATISTICAL MACHINE
Filed Sept. 25, 1937　　21 Sheets-Sheet 7

INVENTOR
JOSEPH M. McDONNELL
BY H. A. Sparks
ATTORNEY

April 28, 1942.  J. M. McDONNELL  2,280,924
STATISTICAL MACHINE
Filed Sept. 25, 1937  21 Sheets-Sheet 8

INVENTOR
JOSEPH M. McDONNELL
BY *N. A. Sparks*
ATTORNEY

April 28, 1942. J. M. McDONNELL 2,280,924
STATISTICAL MACHINE
Filed Sept. 25, 1937 21 Sheets-Sheet 9

INVENTOR
JOSEPH M. MCDONNELL
BY N. A. Sparks
ATTORNEY

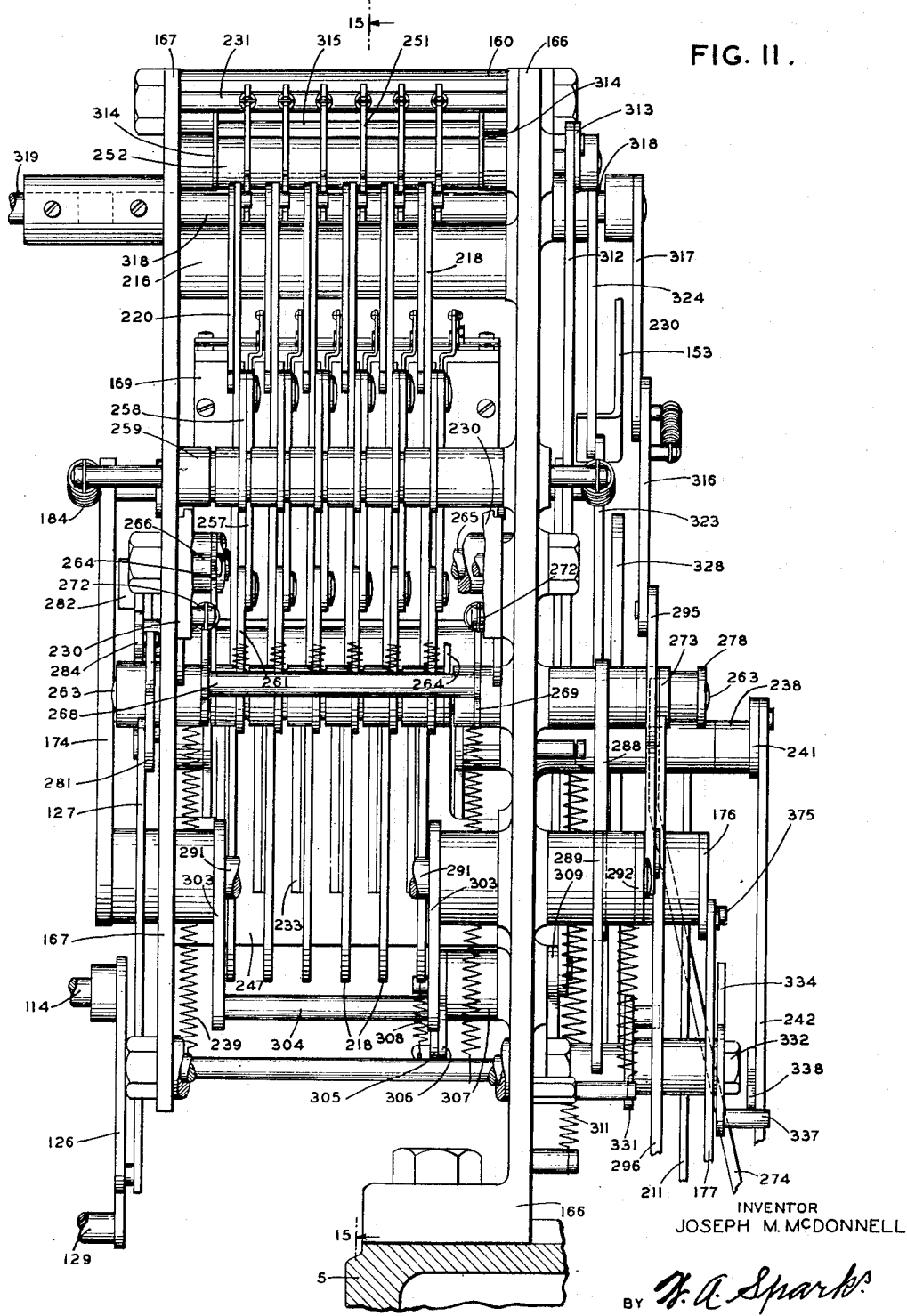

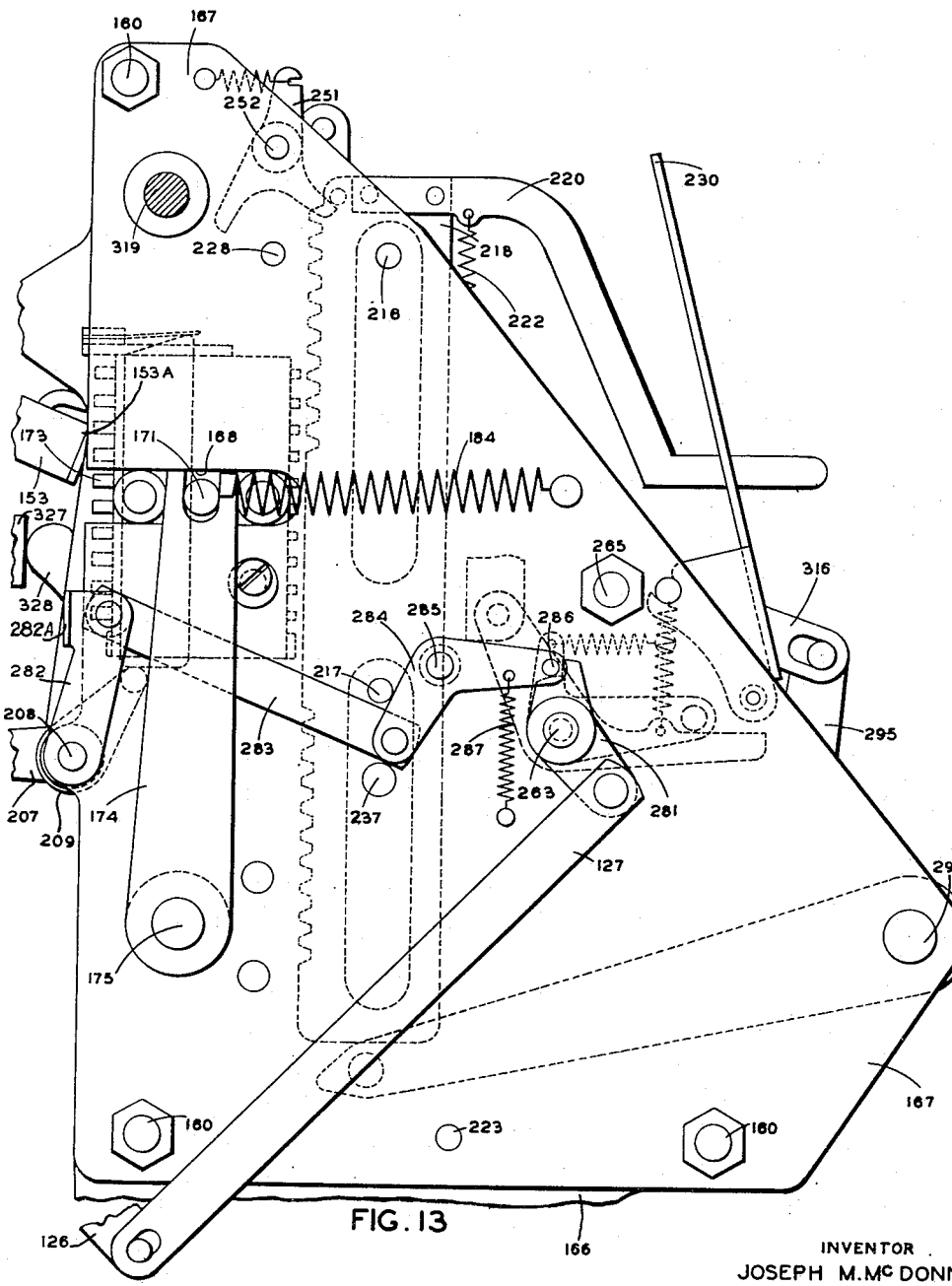

April 28, 1942.   J. M. McDONNELL   2,280,924
STATISTICAL MACHINE
Filed Sept. 25, 1937   21 Sheets-Sheet 13
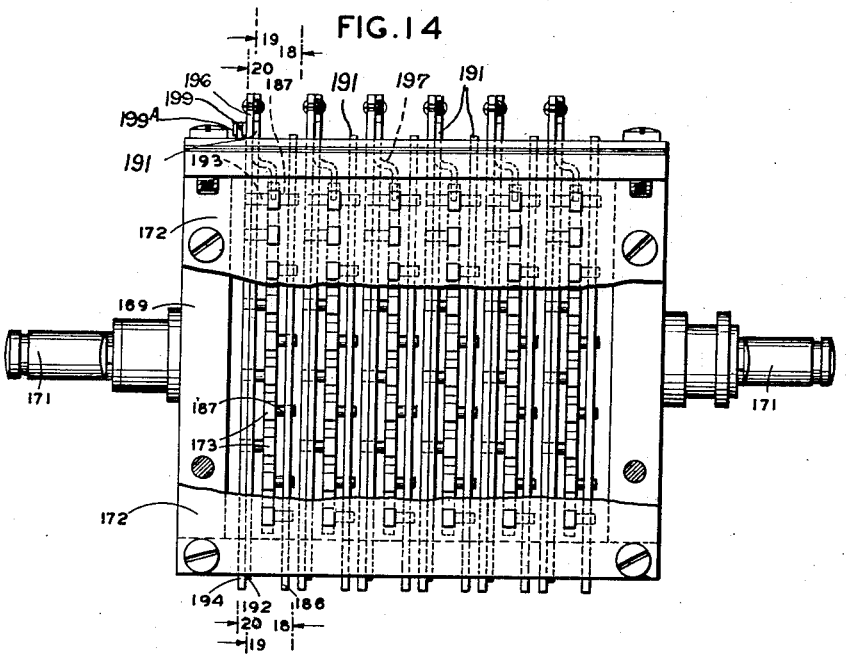
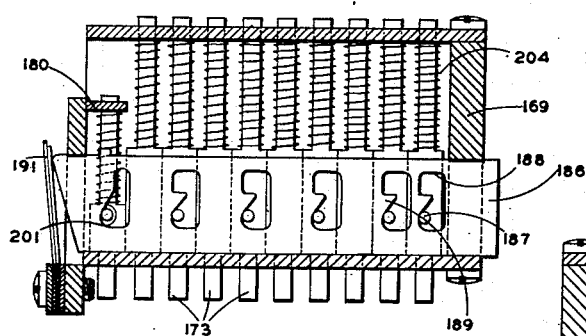
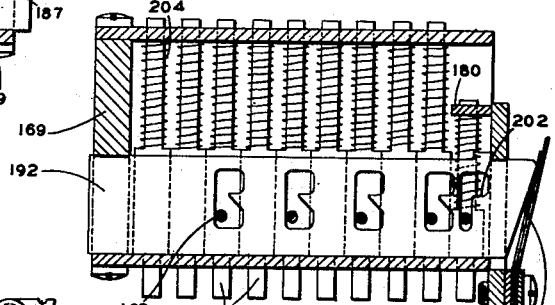
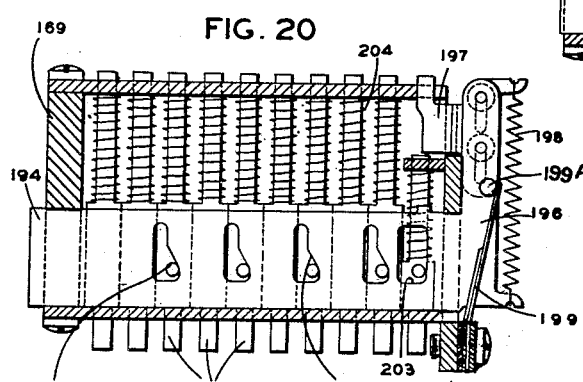
INVENTOR
JOSEPH M. McDONNELL
BY *W. A. Sparks*
ATTORNEY

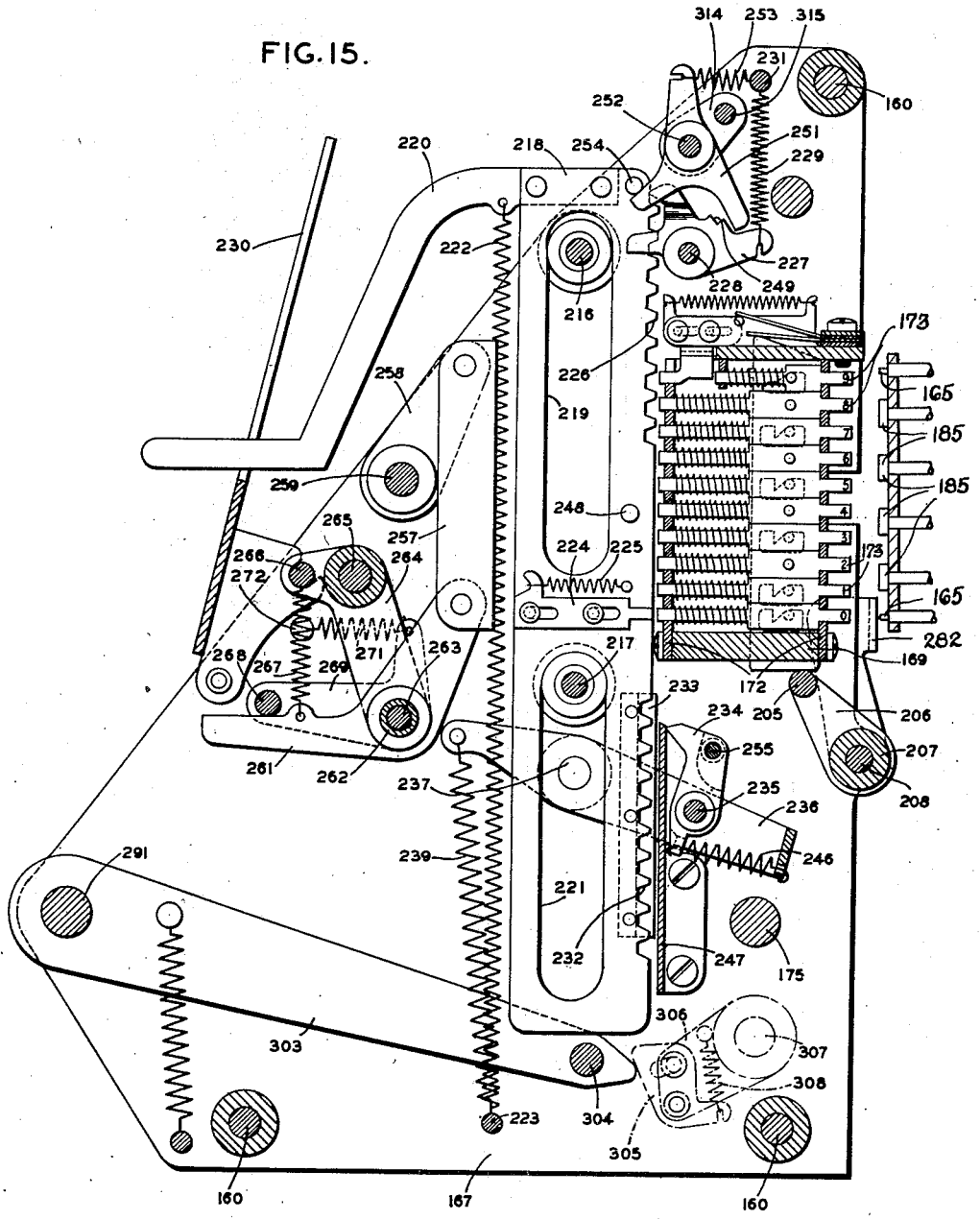

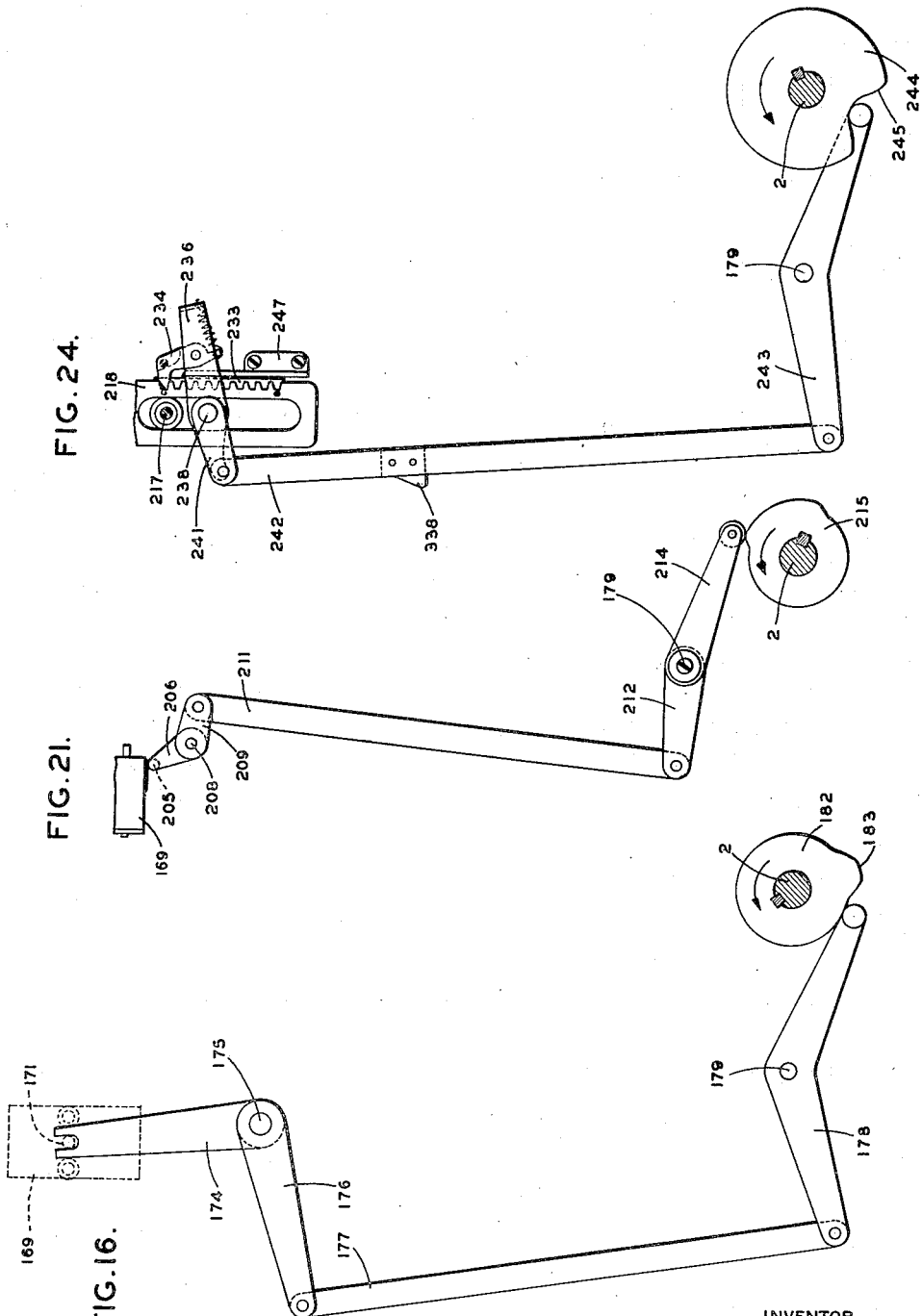

April 28, 1942.   J. M. McDONNELL   2,280,924
STATISTICAL MACHINE
Filed Sept. 25, 1937   21 Sheets-Sheet 16
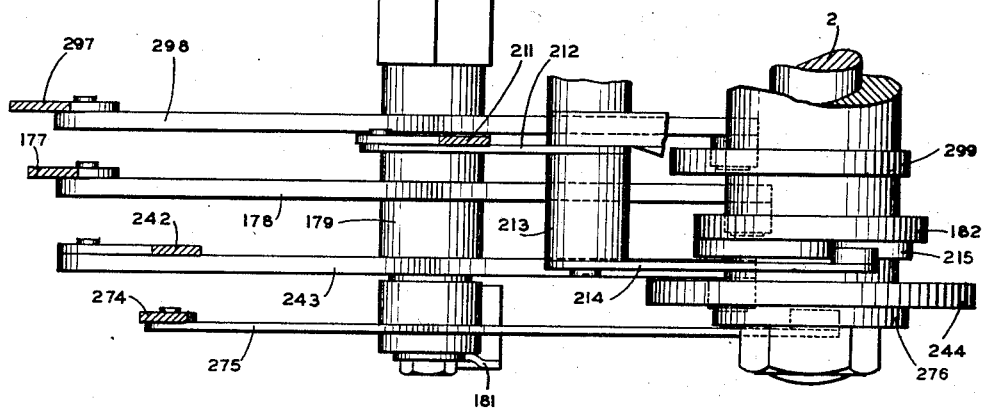
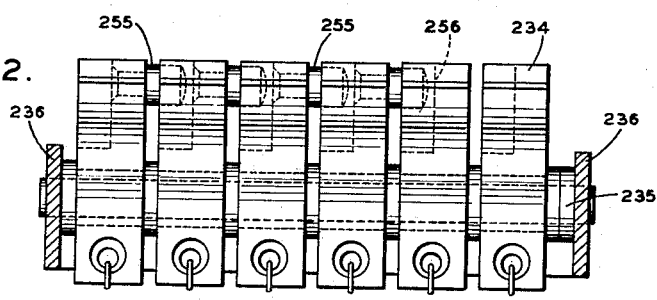
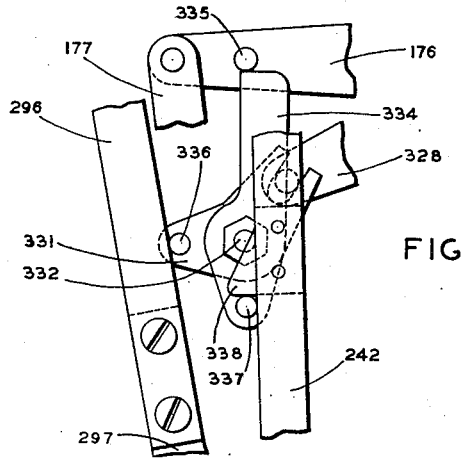
INVENTOR
JOSEPH M. McDONNELL
BY *H. A. Sparks*
ATTORNEY April 28, 1942.　　　J. M. McDONNELL　　　2,280,924
STATISTICAL MACHINE
Filed Sept. 25, 1937　　　21 Sheets-Sheet 17

INVENTOR
JOSEPH M. McDONNELL
BY W. A. Sparks
ATTORNEY

April 28, 1942.  J. M. McDONNELL  2,280,924
STATISTICAL MACHINE
Filed Sept. 25, 1937  21 Sheets-Sheet 18
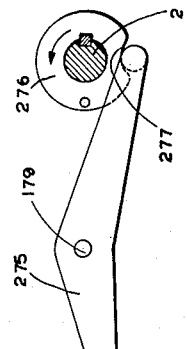
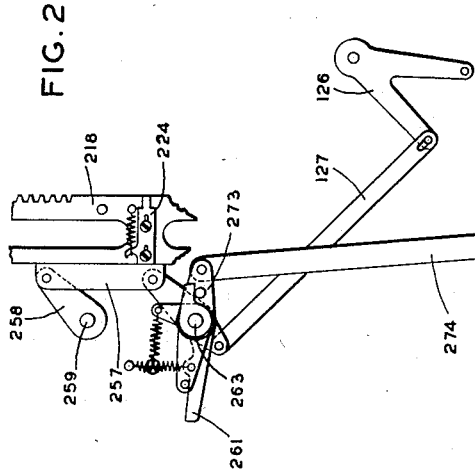
FIG. 25.
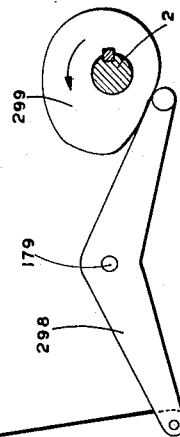
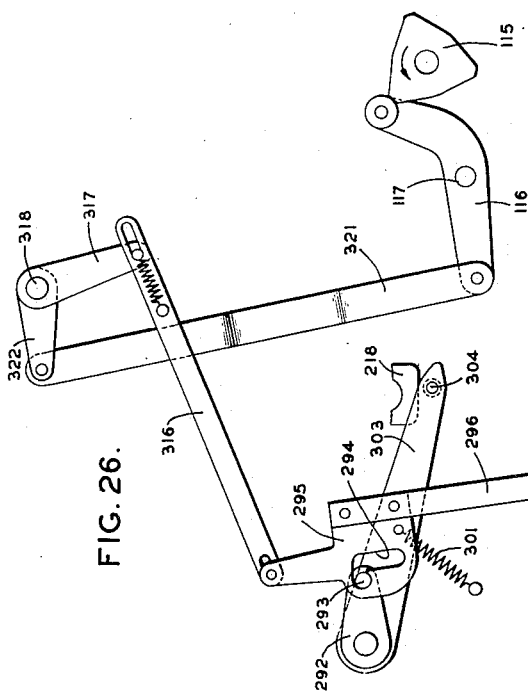
FIG. 26.
INVENTOR
JOSEPH M. McDONNELL
BY F. A. Sparks
ATTORNEY April 28, 1942.  J. M. McDONNELL  2,280,924
STATISTICAL MACHINE
Filed Sept. 25, 1937   21 Sheets-Sheet 19

INVENTOR
JOSEPH M. McDONNELL
BY *W. A. Sparks*
ATTORNEY

April 28, 1942.   J. M. McDONNELL   2,280,924
STATISTICAL MACHINE
Filed Sept. 25, 1937   21 Sheets-Sheet 20

INVENTOR
JOSEPH M. McDONNELL
BY W. A. Sparks
ATTORNEY

April 28, 1942. J. M. McDONNELL 2,280,924
STATISTICAL MACHINE
Filed Sept. 25, 1937 21 Sheets-Sheet 21

INVENTOR
JOSEPH M. McDONNELL
BY H. A. Sparks
ATTORNEY

Patented Apr. 28, 1942

2,280,924

UNITED STATES PATENT OFFICE 2,280,924

STATISTICAL MACHINE

Joseph M. McDonnell, Ozone Park, N. Y., assignor to Remington Rand Inc., Buffalo, N. Y., a corporation of Delaware Application September 25, 1937, Serial No. 165,661

6 Claims. (Cl. 235—61.7)

This invention relates generally to punched card accounting machines and more particularly to machines of this type which are adapted to tabulate a set of serially numbered sequentially arranged record cards according to the consecutively numbered groups of cards contained therein.

The machine of the present invention is an improvement of the machine disclosed in my earlier application S. N. 156,304 filed July 29, 1937. Both machines, that of the previous application and that of the present application, perform identical functions and both are aimed primarily at the mechanization of the same type of accounting problems. This problem is set forth in considerable detail in the above application and, therefore, is not described herein. The machine of the present application is, like the machine of application S. N. 156,304, a modification of the standard Powers tabulator and, as previously mentioned, is adapted to tabulate serially numbered record cards according to the consecutively numbered groups contained therein. The general function of both the old and the new machine is to compare the serial number of each successive record card with that of its immediate predecessor, to print the number of the first card of each sequential order, to count one into an accumulator for each card of a consecutively numbered group, to accumulate the number of the first card of a consecutive order in another accumulator and to count one into the latter accumulator for each succeeding consecutively numbered card after the first, and to take a total automatically from the above two accumulators when the consecutive order of the serially numbered record cards is broken. Printing mechanism cooperable with the above two accumulating units is provided, which is adapted to function only during total taking operations. A third printing unit is provided which is adapted to operate only on the first machine cycle following a total to effect printing of the first number of a consecutive order. A standard type of line space mechanism is also provided which is adapted to function only during total taking operations. The tabulation of each consecutively numbered group of cards, therefore, appears on one line of the report sheet, the several printing units being so arranged that the first number of a sequence, the last number and the total number of cards in a sequence are arranged from left to right in that order. The improvements in the above mechanism, as disclosed herein, include a simplified method of comparing the serial numbers of the record cards, a more direct method of instituting a total taking operation, and a general re-design of the sequence verifying mechanism, which enables the mechanism of the invention to be easily mounted on any standard 45 or 90 column type Powers tabulator.

One object of the invention is an improved and simple method of tabulating a set of serially numbered record cards according to the consecutively numbered groups contained therein.

Another object of the invention is a novel method of comparing the serial numbers of successive sequentially arranged record cards, which is wider in its application and easier of assembly than any similar type of mechanism previously used.

Other objects and structural details of my invention will be apparent from the following description when read in connection with the accompanying drawings, wherein:

Fig. 2 is a view in right-hand cross-section of the base section of the tabulator;

Fig. 5A is a detail view of certain standard total taking linkage and its association with a shaft of the present invention;

Fig. 6A is a partial plan view of the translator showing the card count block and nine disabling mechanism.

Figure 6:
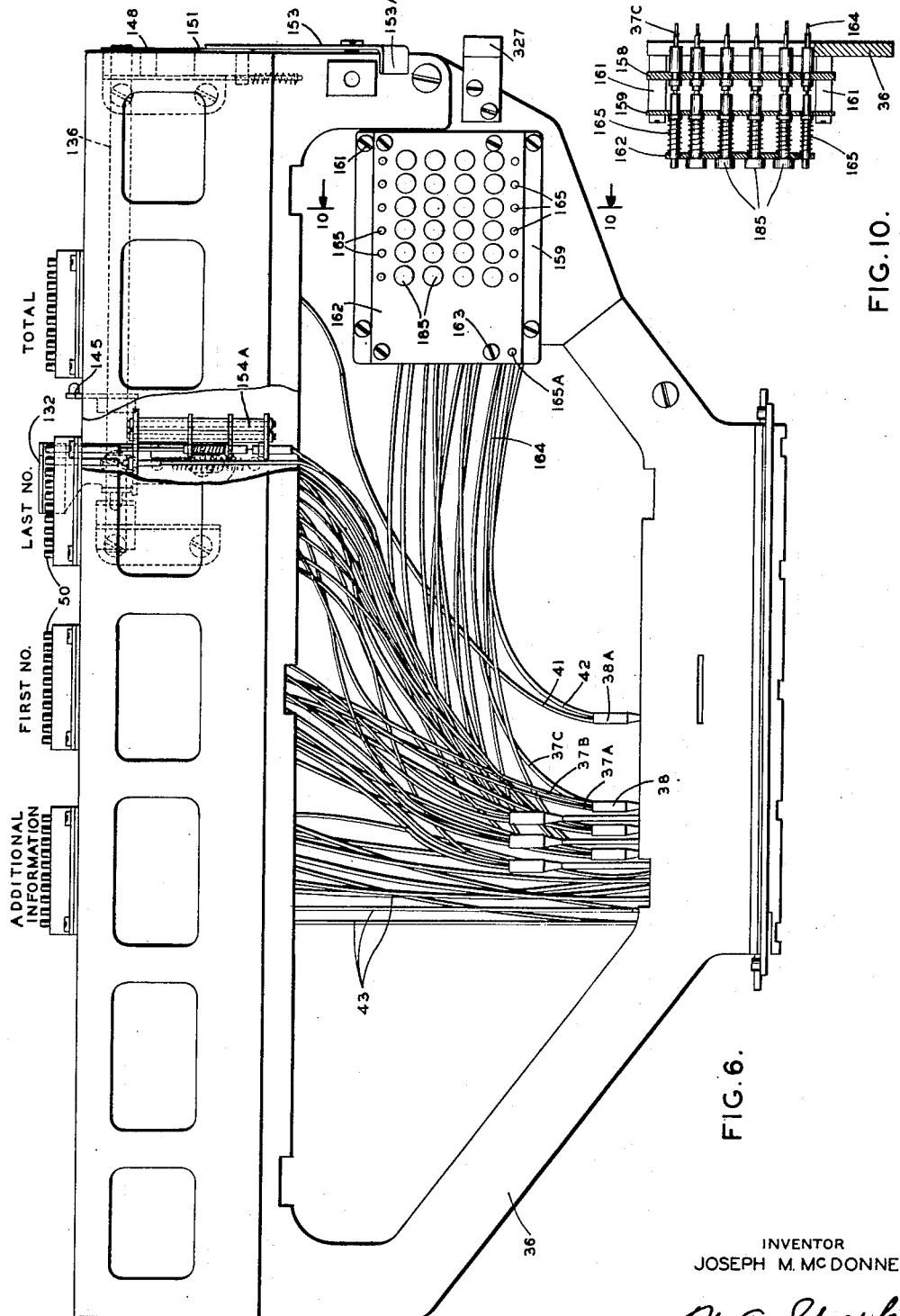
Fig. 6 is a view in front elevation of the translator used in a 90-column tabulator of the type disclosed herein.
Figure 7:
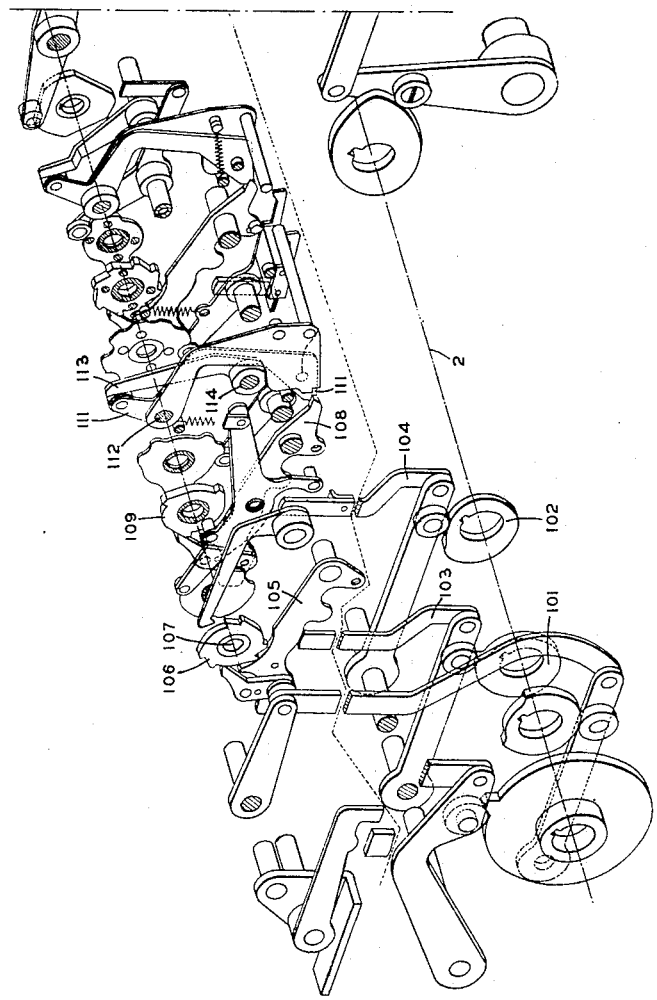
Figure 8:
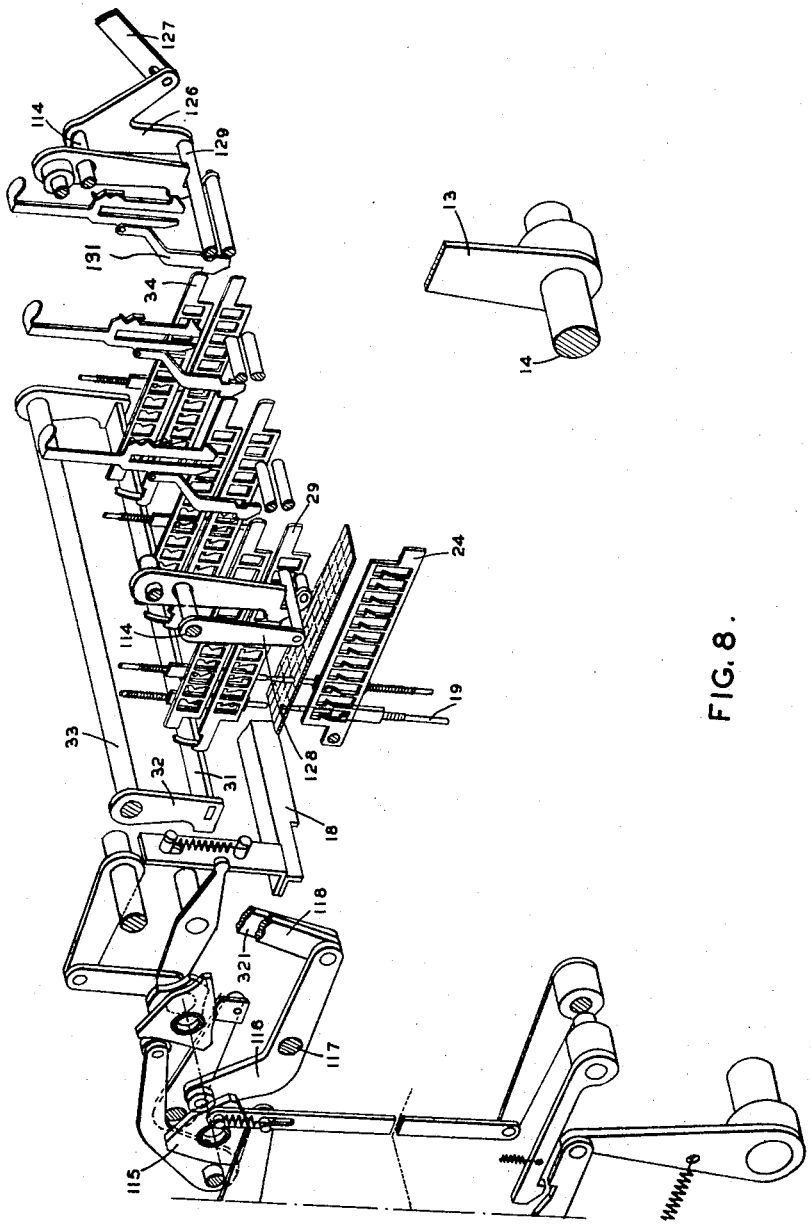
Figure 9:
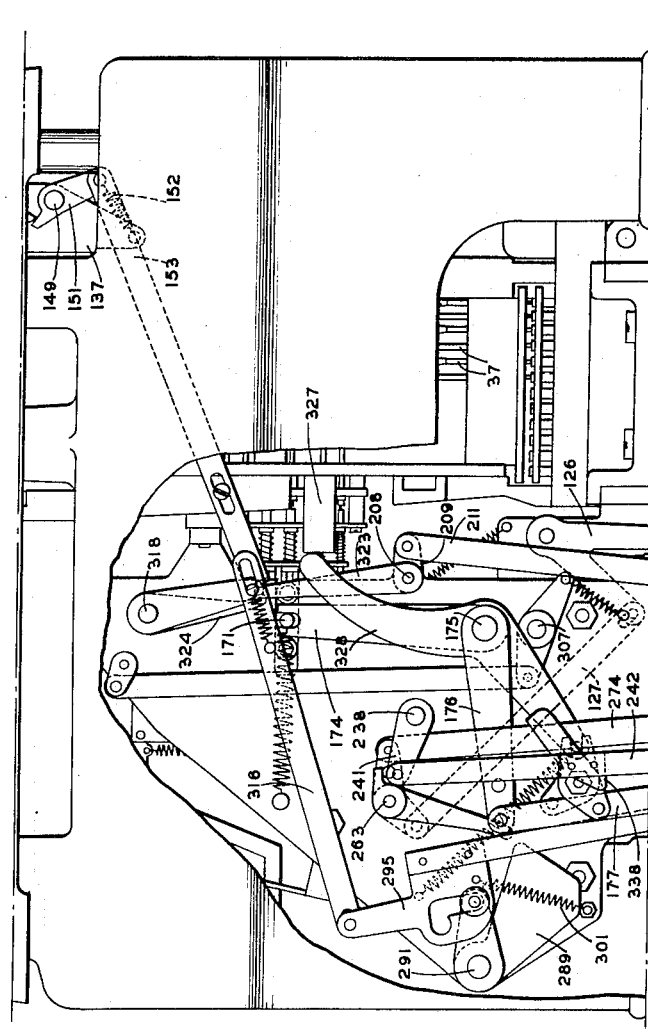
Figure 12:
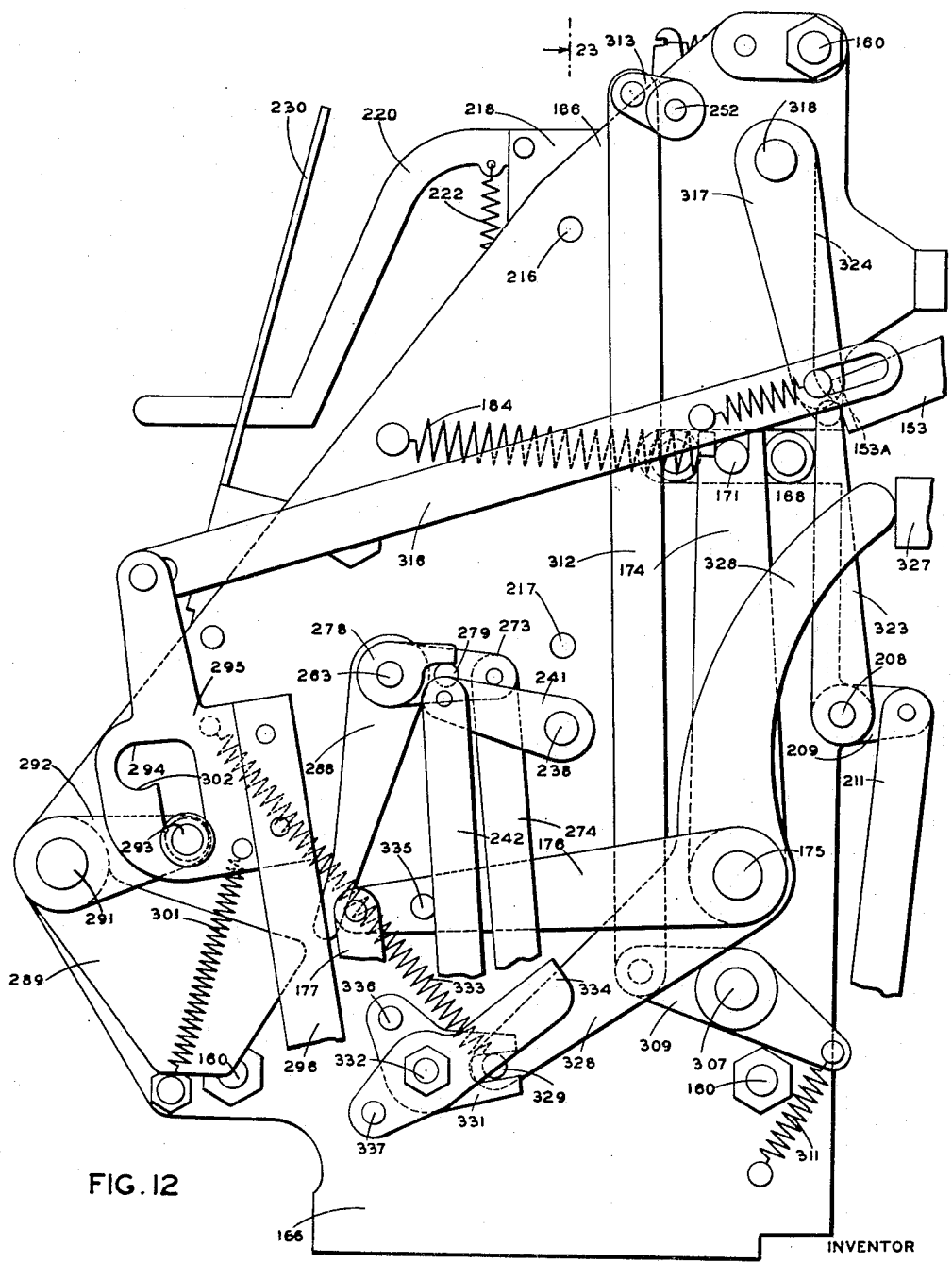

Figs. 7 and 8 when read together, comprise a composite view in exploded isometric of the automatic total control unit;

Fig. 9 is a view in right-hand side elevation of the intermediate section of the tabulator with a portion of the frame work broken away to disclose the location of the comparing unit;

Fig. 10 is a detailed sectional view along line 10—10 of Fig. 6;

Fig. 11 is a view of the comparing unit in front elevation;

Fig. 12 is a view of the comparing unit in right-hand side elevation;

Fig. 13 is a view of the comparing unit in left-hand side elevation;

Fig. 14 is a detailed view in rear elevation of the 90-column decoding pin box;

Fig. 15 is a cross sectional view of the comparing unit taken along the line 15—15 of Fig. 11;

Fig. 16 is a detailed view of the operating mechanism for reciprocating the decoding pin box;

Fig. 17 is a detailed plan view of the cams, and the levers associated therewith, for controlling the mechanism of the comparing unit;

Fig. 18 is a detailed sectional view taken on the line 18—18 of Fig. 14 and swung 90° counter-clockwise;

Fig. 19 is a detailed sectional view taken on the line 19—19 of Fig. 14 and swung 90° clockwise;

Fig. 20 is a detailed sectional view taken on the line 20—20 of Fig. 14 and swung 90° clockwise.

Figure 1:
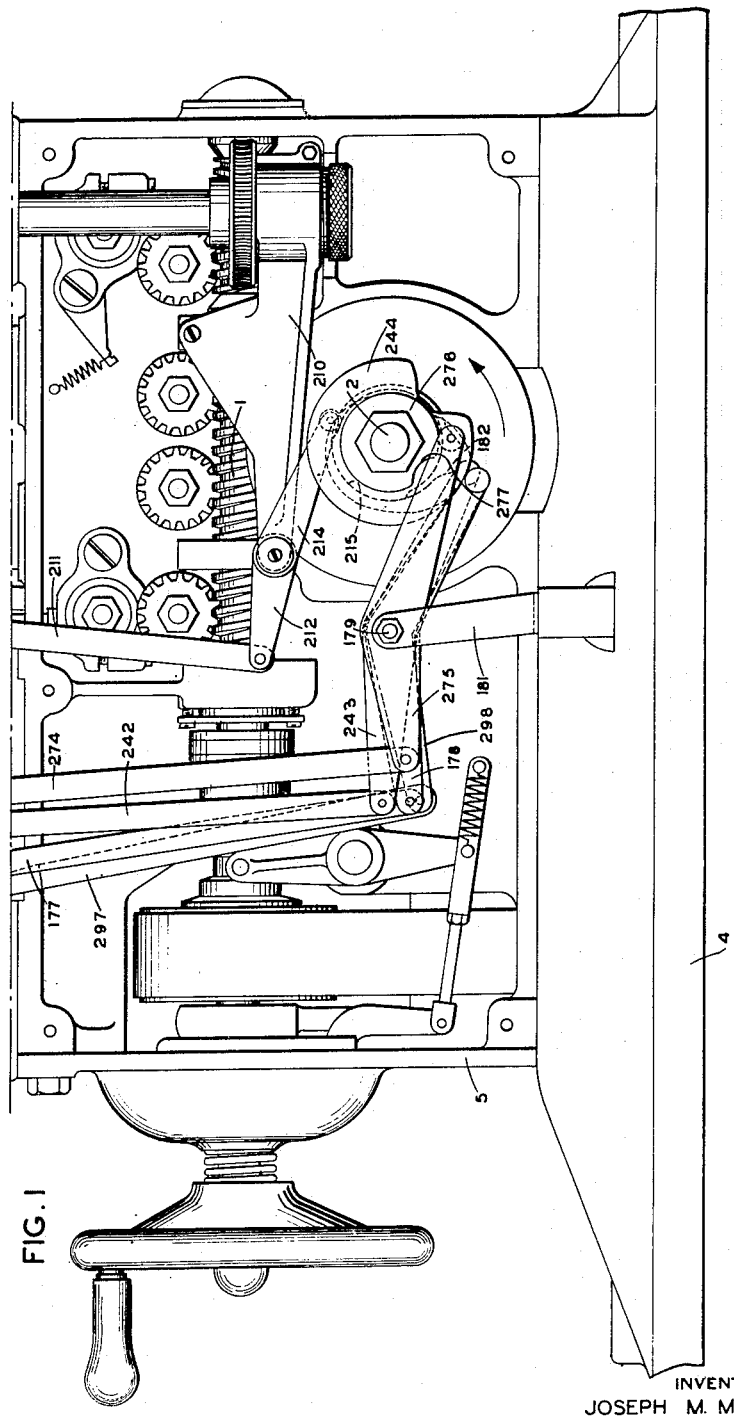
Fig. 1 is a view in right-hand side elevation of the base section of a Powers tabulator with the outside frame plate removed.
Figure 3:
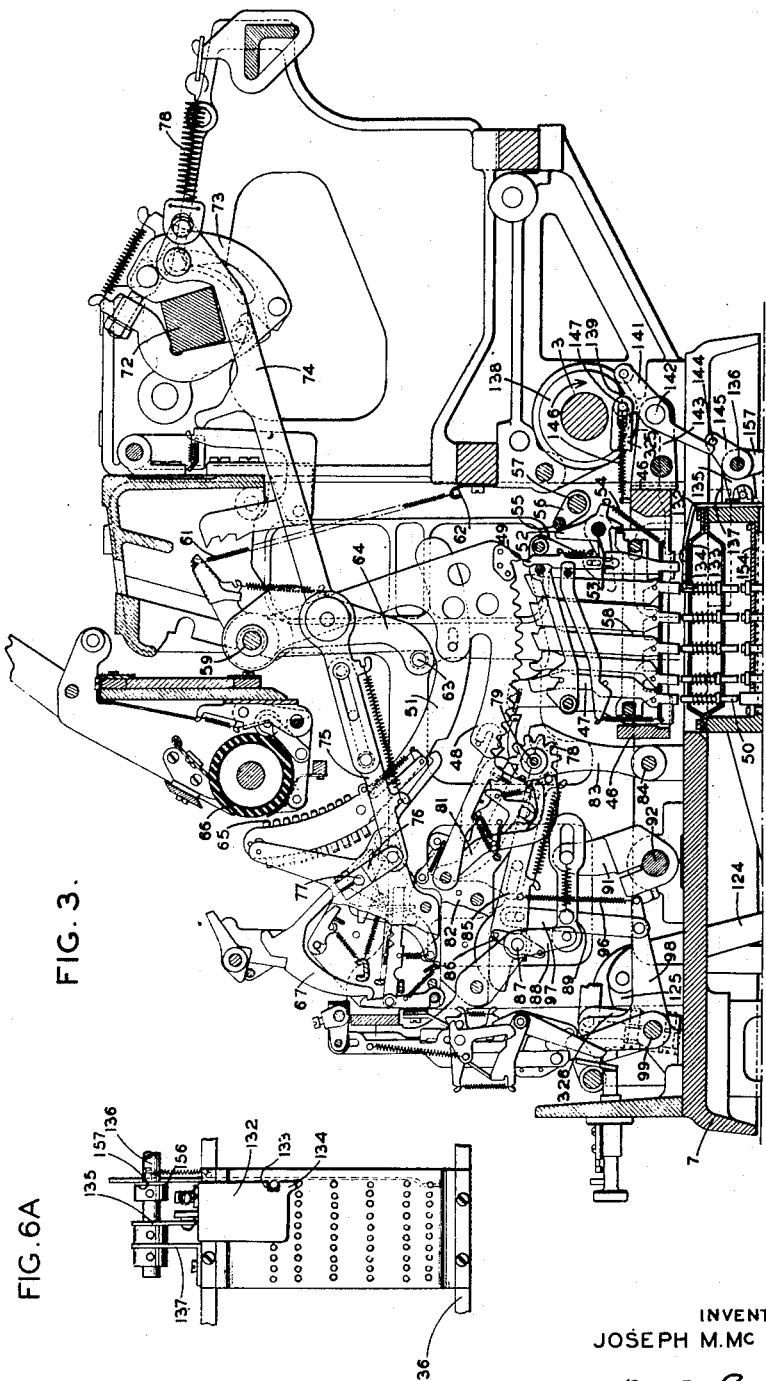
Fig. 3 is a view in right-hand cross-section of the head section of the tabulator.
Figure 4:
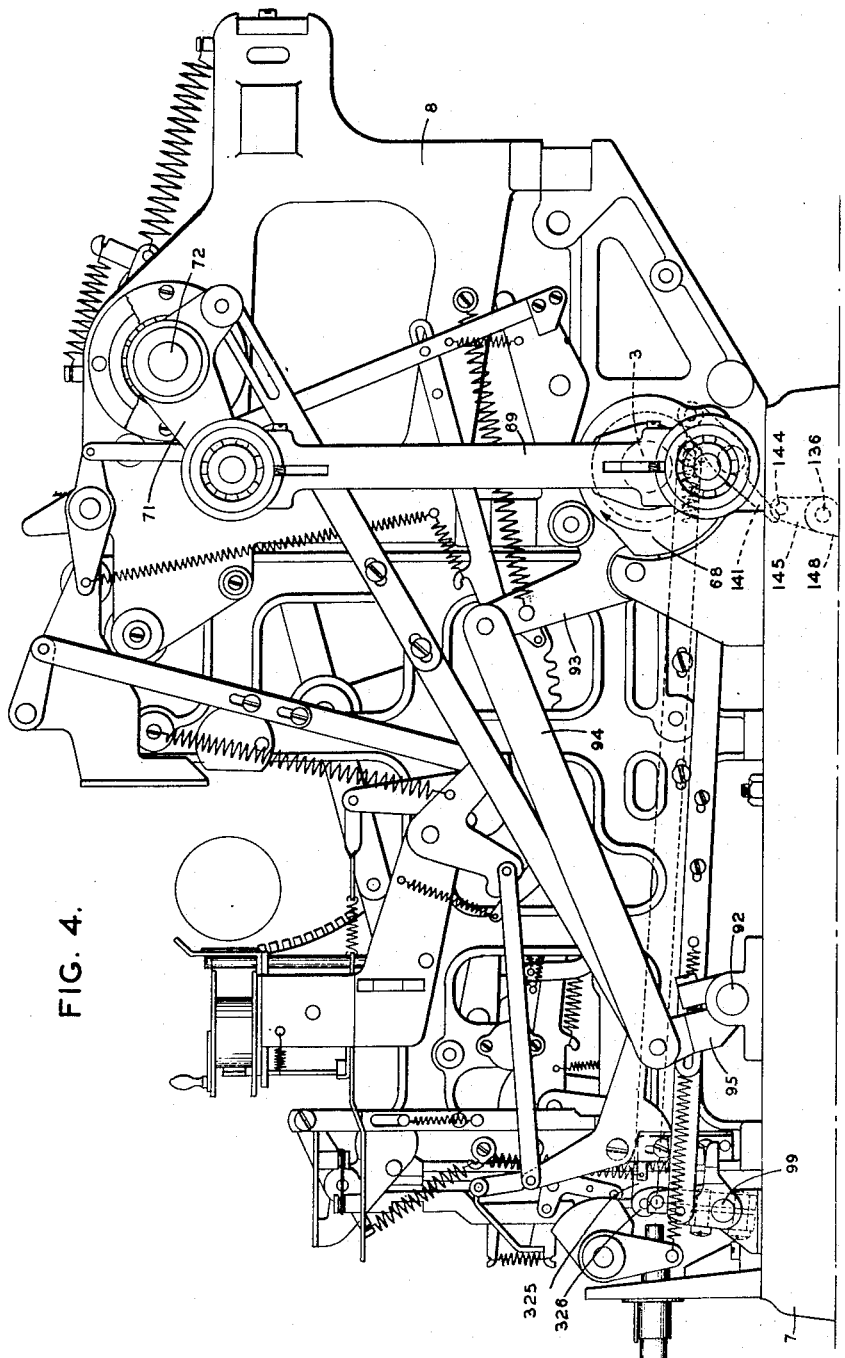
Fig. 4 is a view in right-hand side elevation of the head section of the tabulator.
Figure 5:
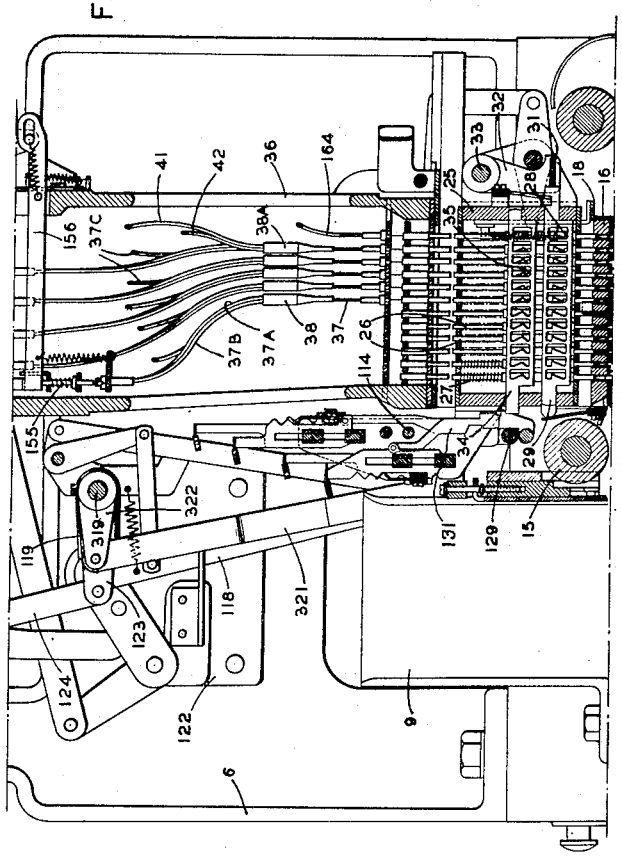
Fig. 5 is a view in right-hand cross-section of the intermediate section of the tabulator.
Figure 23:
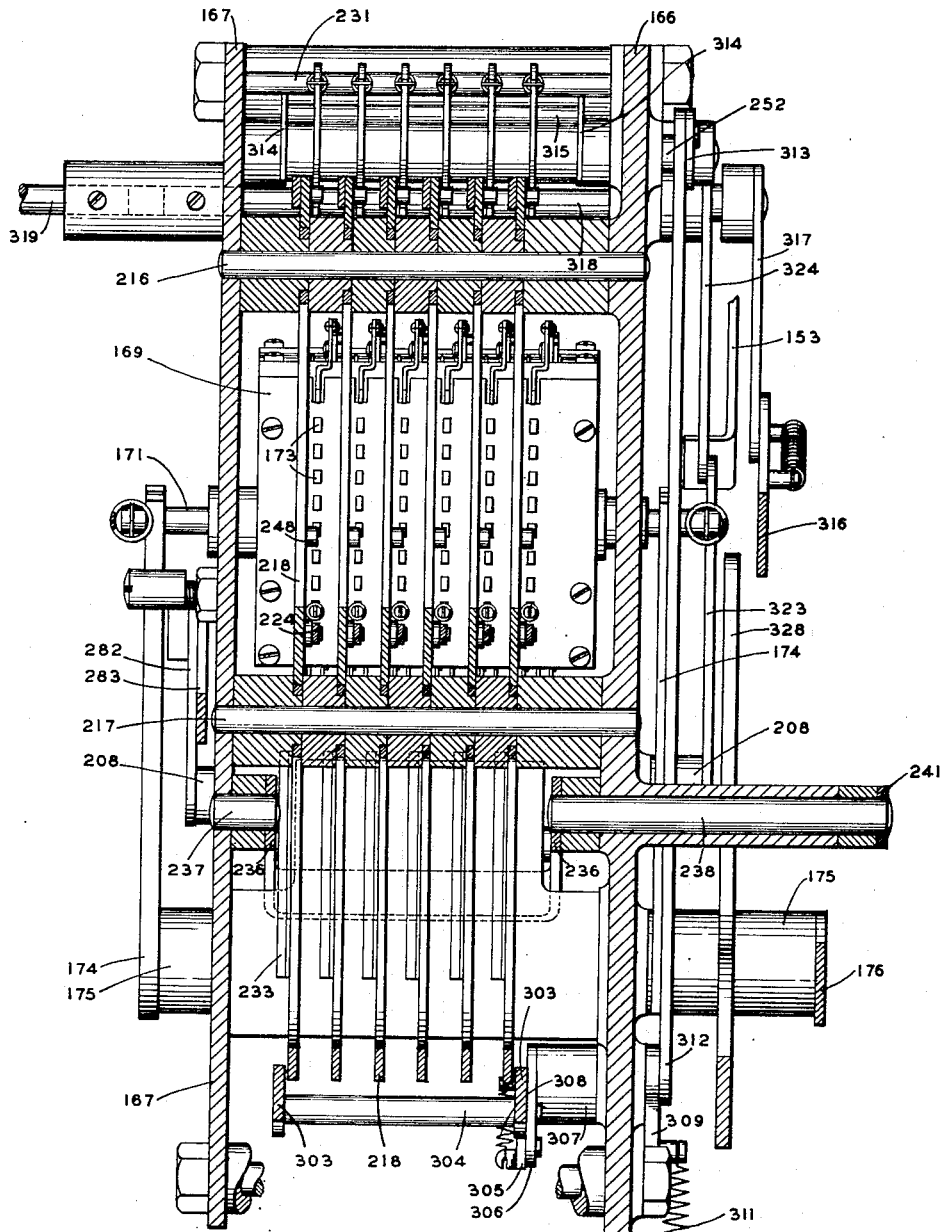
Figure 28:
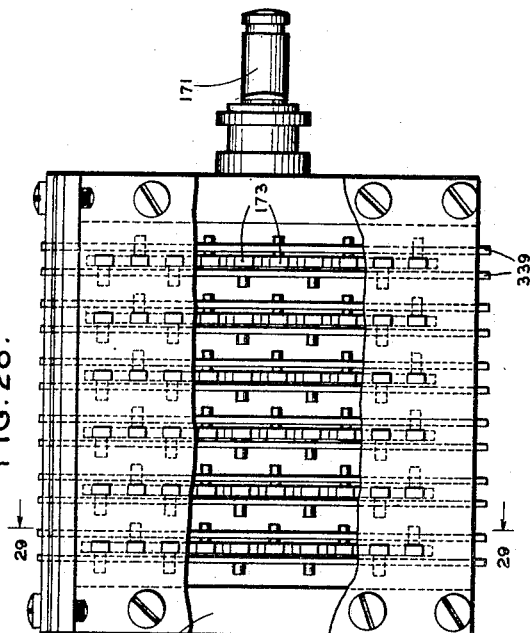
Figure 29:
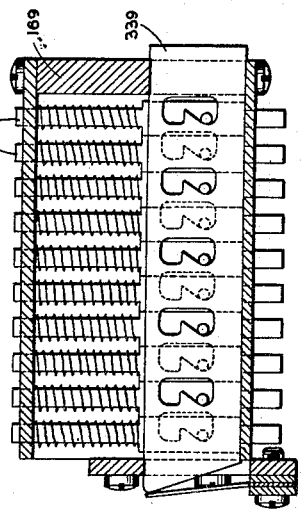
Figure 30:
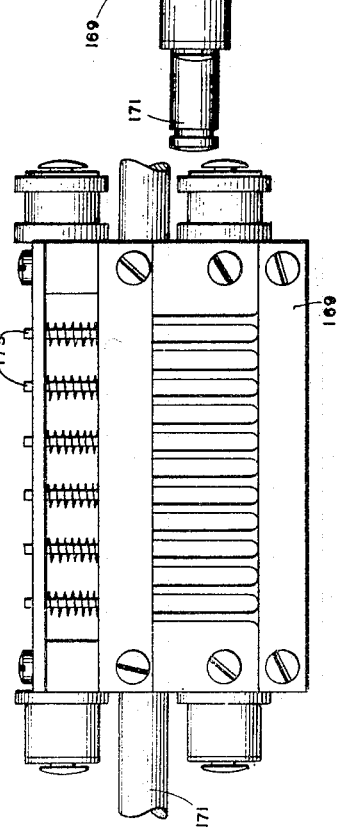
Figure 31:
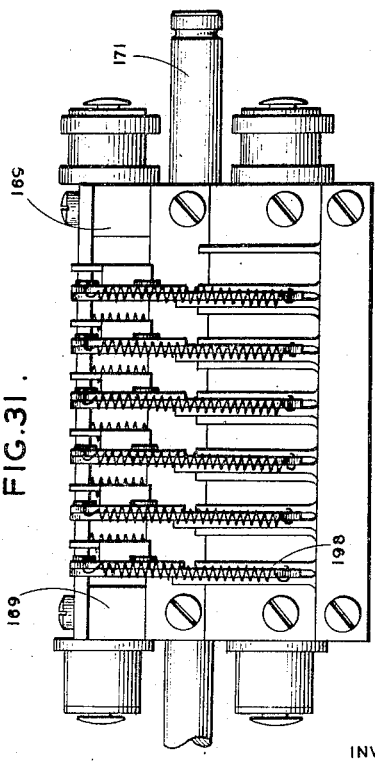
Figure 32:
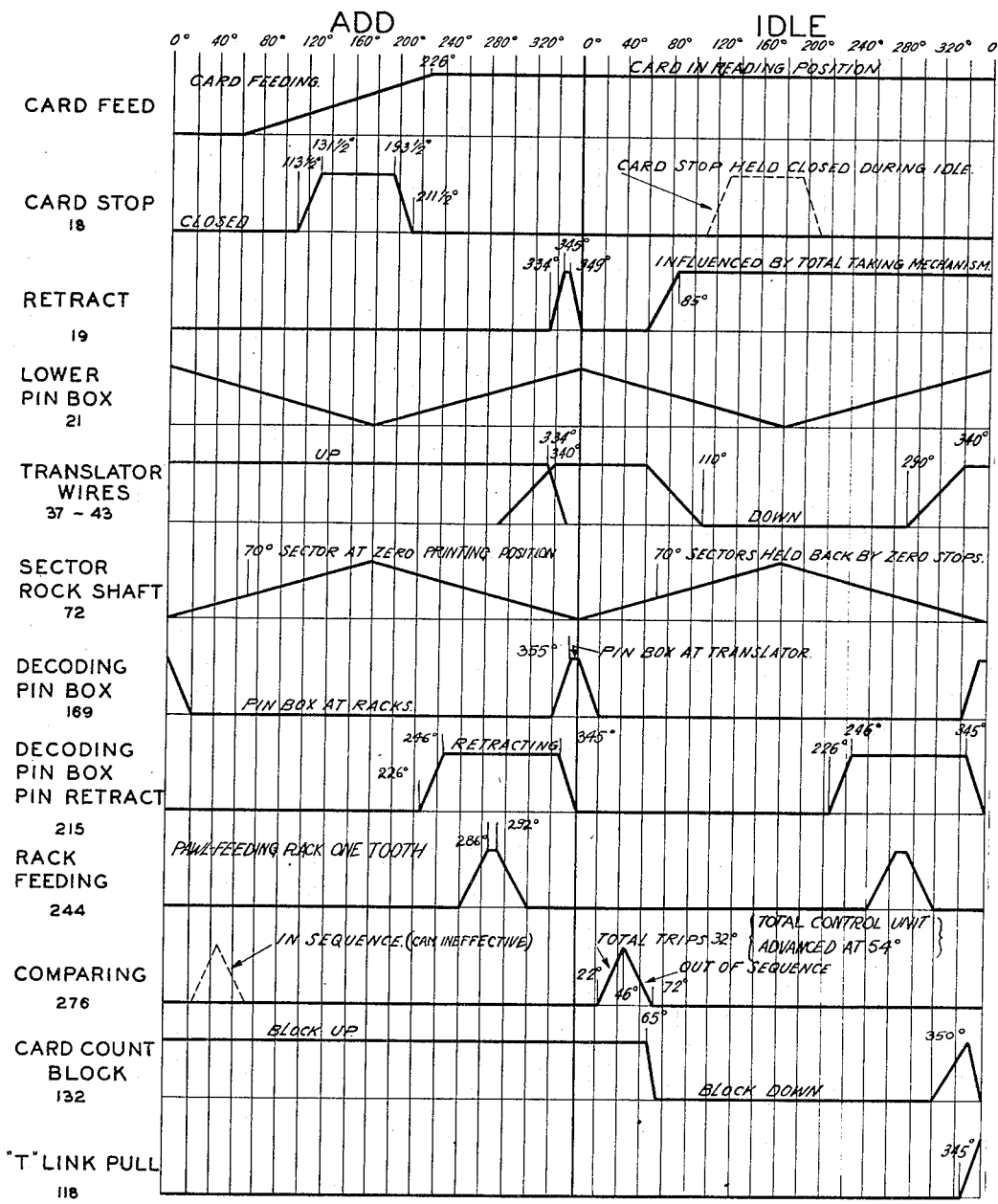
Figure 33:
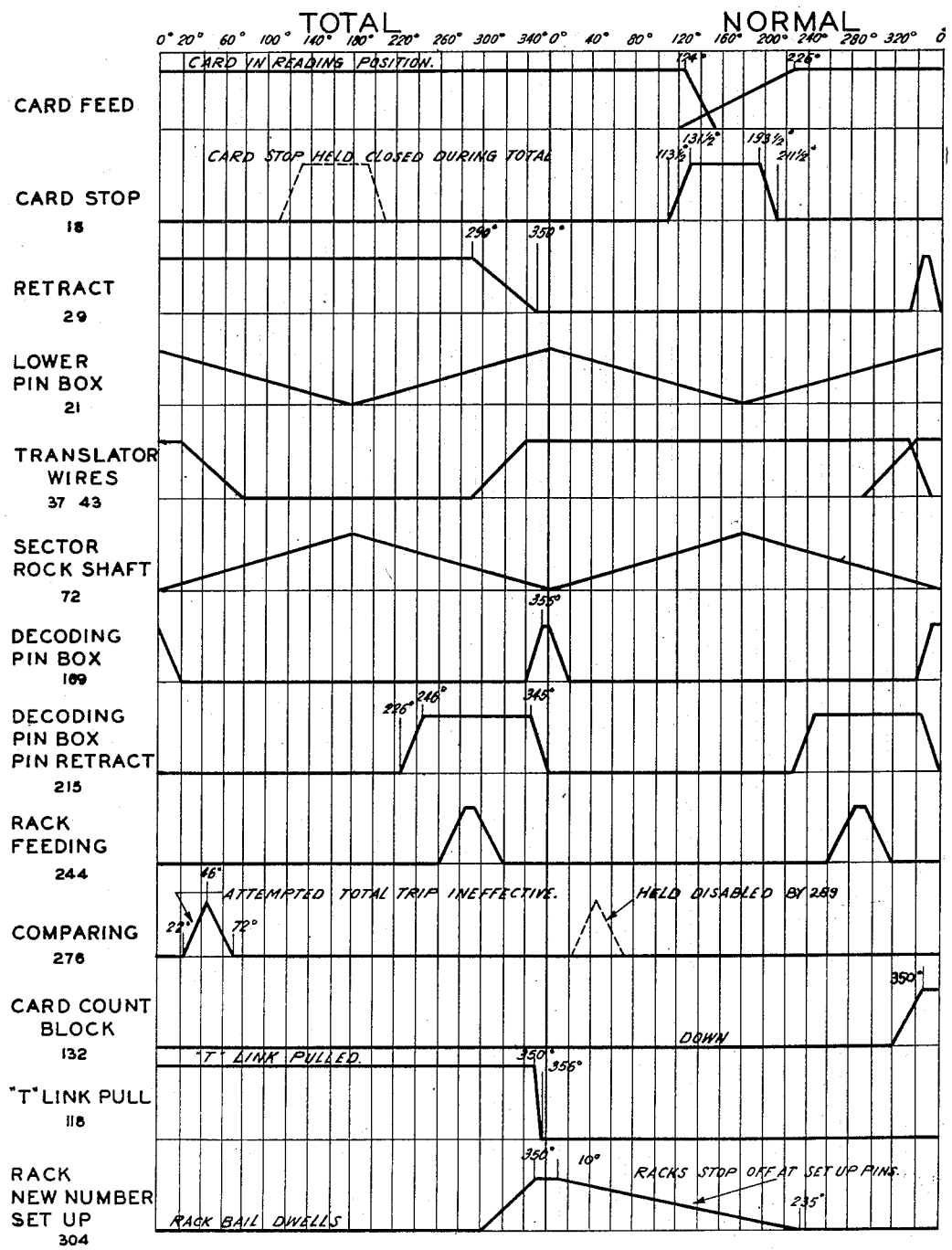

Fig. 21 is a detailed view in operating position of the mechanism for retracting the locking slides of the decoding pin box;

Fig. 22 is a detailed view in front elevation of the rack feeding pawls;

Fig. 23 is a front sectional view of the comparing unit taken along the lines 23—23 of Fig. 12;

Fig. 24 is a detailed view in operating position of the rack feeding mechanism;

Fig. 25 is a detailed view in operating position of the sensing or comparing mechanism;

Fig. 26 is a view in operating position of the rack new number set-up mechanism;

Fig. 27 is a detail view of the comparing unit disabling mechanism in effective engaging position;

Fig. 28 is a rear view of a forty-five-column decoding pin box;

Fig. 29 is a cross section taken on line 29—29 of Fig. 28 and swung 90° counterclockwise;

Fig. 30 is a side view of Fig. 28;

Fig. 31 is a plan view in elevation of the ninety-column decoding pin box;

Figs. 32 and 33 are timing diagrams;

Fig. 34 is a diagram illustrating the manner in which Figs. 1, 9, and 4 should be arranged to obtain a composite view in right-hand side elevation of the machine;

Fig. 35 is a diagram illustrating the manner in which Figs. 2, 5, and 3 should be arranged to obtain a composite view in right-hand cross-section of the machine.

Included in the mechanism of the machine is certain total taking control mechanism, the operation of which is initiated automatically upon a break in the consecutive order of the serial numbers. For purposes of brevity the act of initiating an operation of this mechanism is frequently referred to, in the structural description to follow, as "tripping a total." It will be understood, therefore, that each occurrence of this phrase or its equivalent indicates the initiation of an operation of the total taking control mechanism. Also appearing frequently in the specification is the term "pivoted to" or "pivotally mounted on," used herein to denote that an element is loosely connected to another and is movable relatively thereto. This term has the above meaning wherever it is used.

MACHINE OPERATION

As previously mentioned, the machine of the present application is a modification of the well known Powers tabulator and is similar in its general features of construction and operation to the machine described in the above application S. N. 156,304. With the exception of certain alterations in the the timing and the total control mechanism to be described later, the mechanism for feeding and analyzing the record cards is the same as that disclosed in the patent to William W. Lasker No. 2,044,119 issued June 16, 1936. As disclosed in the above patent, and illustrated herein, the machine is power driven by an electric motor (not shown) and suitable gearing, including a worm gear 1 (Fig. 1), leading directly from the motor is employed to drive a main base shaft 2 (Figs. 1 and 2) and a main head shaft 3 (Figs. 3 and 4). The mechanism of the base is mounted on a base plate 4 (Figs. 1 and 2) and is enclosed by frame plates 5 also mounted on the base plate 4. Intermediate frame plates 6 (Fig. 5) are fastened, at their lower ends, to the base frames 5 and are secured, at their upper ends, to another plate 7 (Figs. 3 and 4) on the upper surface of which the various head mechanisms are mounted. Additional framework 8 (Fig. 4), which contributes to the support of the head mechanism, is mounted on the base plate 7 and the entire head section (except, of course, the printing platen) is enclosed by a light metal easily removable casing (not shown).

Mechanism not fully shown herein but which has been disclosed in numerous previous applications and patents is provided for switching the electric motor on and off, and for causing the engagement and disengagement of the worm gear 1 with the drive controlled by the motor. The Lasker Patent 2,044,119 is again referred to for a more complete disclosure of the above clutch mechanism and for all other base mechanisms not herein specifically indicated.

CARD FEED AND SENSING

Referring now to Figs. 2 and 5, the storage chamber or card magazine is shown therein, indicated by the reference numeral 9. A stack of perforated record cards is adapted to be placed in the magazine 9 and a picker knife and block 11 is provided to feed the cards seriatim from the magazine into position for sensing. The picker knife 11 is reciprocated through the base of the card magazine once for every cycle of the shaft 2, by a link 12 connected to the block, an arm 13 connected at one end to the link 12 and at its other end to a shaft 14, and a cam (not shown) secured on the main shaft 2. Each of the cards is fed between a pair of power driven feed rolls 15 and thereby into the sensing chamber comprised of a pair of perforated plates 16 and 17. As the card enters the sensing chamber it is picked up by a pair of spring tensioned rollers (not shown) and driven rearwardly until it comes to rest against a card stop 18. The card stop 18 is reciprocated vertically by a cam (not shown) on the main shaft 2 once for every cycle of the machine to block the exit of the sensing chamber while the card is being sensed. The card stop mechanism used in the present machine is identical with that disclosed in the above-mentioned patent and need not be further described here. The sensing of the card is performed by a plurality of pins 19 supported in a pin box 21. The pin box 21 is reciprocated vertically once for each cycle of the machine by an eccentric disk 22 mounted on the shaft 2. There are forty-five columns of pins 19 and each column consists of twelve pins. Therefore an entire card, whether it be of a forty-five or ninety-column type may be sensed in one operation. Returning now to the card locked in the sensing chamber it will be seen that the rising pins 19 will pass through their respective perforations in the lower chamber plate 17. Those pins 19 which find perforations in the card will continue to rise, passing through the card and into the upper chamber plate 16. Those pins which find no perforation merely press idly against the bottom of the card while the pin box continues to rise against the tension of springs 23, one of which is provided for each pin 19. A locking slide 24 is provided to engage the elevated pins 19 and impart to them a positive elevating movement. Positioned directly above the sensing pin box 21 is an intermediate pin box 25 (Fig. 5) which supports intermediate pins 26 in equal number and arrangement to the sensing pins 19. The lower ends of the pins 26 lie directly over their respective pins 19 so that any positively elevated pin 19 will contact and elevate its associated pin 26 against the tension of springs 27 one of which surrounds each of the intermediate pins. Each of the pins 26 is provided with lateral extrusions 28 adapted to cooperate with a spring urged locking slide 29. Six of the pins 26 in each column have their extrusion 28 pointing in one direction while the other six pins have their extrusions pointing in the opposite direction. Each set of six extrusions 28 is adapted to cooperate with a separate locking slide 29 so that either set of six pins 26 may be operated independently of the other set. As is well known in this type of machine the above arrangement of locking slides is used only in the ninety-column machines. In a forty-five-column machine such as that disclosed in the Lasker Patent 2,044,119 all twelve of the extrusions 28 extend in the same direction and only one locking slide 29 is used, per column. The function of the locking slides 29 is to lock all of the elevated pins 26 and retain them in elevated position until the reading which they convey to the computing mechanism has been accumulated and printed. The slides 29 are retracted once for each cycle of the machine to release the elevated pins 26 by a bail 31 supported at the rear of the slides 29 by a pair of arms 32 (one shown) secured to a shaft 33. The shaft 33 is supported by framework not shown herein and is adapted to be moved in a reciprocable rocking motion by a cam (not shown) on the main shaft 2. The retraction of the slides 29 is a short spasmodic operation and occurs at a time when the sensing pins 19 are in their highest elevated position so that if identical designation matter appears on two successive cards, the originally elevated pins 26 will not be permitted to descend. A second pair of slides 34 is associated with each column of pins 26 and is operated by extrusions 35 in the same manner as slides 29. The slides 34, however, are not locking slides, but may be called total trip or change of designation slides since their only function is to sense a change in the designating number on a card and to institute a total taking operation when such a change occurs.

TRANSLATOR

The numerical values represented by the upraised pins 26 are transmitted to the head section of the machine, and to the card counting and comparing mechanisms by means of the usual translator 36 (see Figs. 5 and 6) in which is supported a plurality of translator wires 37. Unlike the machine of the previous application the present machine does not employ a rigid type of translator wire, but instead uses the more flexible Bowden wire, thereby requiring the provision of interponent pins between the pins 26 and the translator wires themselves. In the majority of the Powers tabulators the translator is an independent self contained unit which may be easily removed and replaced with a translator of different wiring according to the exigencies of the accounting work to be done. Provision is also made in each translator for accommodating one wire 37 for each pin 26. In the present machine however only a small portion of the card is used at one time so that only as many wires as are necessary to the operation of this machine are mounted in the translator now to be described.

The machine of the previous application S. N. 156,304 was described as operating on record cards bearing serial numbers of six digits or less and for purposes of description the same number is used herein. It should be understood, however, that this number is merely selected by way of a specific example and that the machine may be constructed to accommodate a serial number of any number of digits. Each record card, therefore, bears a serial number of six digits or less and in addition to this bears a special control hole for a purpose later to be explained. Referring now to Fig. 6, each of the translator wires 37 associated with those columns in which the serial number appears, ends in a connector 38 from each of which extends three individual wires 37A, 37B, and 37C. The wire 37A, as shown, extends into a unit designated in Fig. 6 as First number. The wire 37B extends into the unit designated Last number and the wire 37C into the rear of a pin box secured to the right-hand side of the translator. This pin box is associated with the card comparing mechanism and will be considered in greater detail a little later in the description. The special control hole, previously mentioned, is adapted to control a separate translator wire 37 which also ends in a connector 38A. Extending from the connector 38A is a wire 41, which extends into the unit marked Total, and a wire 42 which also extends into the pin box on the front of the translator to serve a purpose later to be described. The elevation of any wire 37, therefore, will cause the simultaneous operation of the wires 37A, 37B, and 37C associated with the elevated wire 37. When the machine is used for counting and comparing work each card will bear a special control hole so that the special wires 41 and 42 will be in constant operation. The use of Y wires in the translator to transmit identical data simultaneously into a plurality of accumulating units is old and well known in the Powers machine so that a further discussion of the arrangement of my translator seems unnecessary. Also mounted in the present translator is a plurality of wires 43 which extend into the unit marked Additional information. The wires 43 are associated with a separate field of the card and merely serve the purpose of providing a means for printing additional designating information at various points during a run of cards. This extra unit does not affect the operation of the counting and comparing mechanisms. The Bowden wires in the translator operate pins 50 in the well known manner to set up the stops in the stop basket.

Stop Basket

Each of the above units First number, Last number, Total and Additional information is individually associated in the usual manner with a regular Powers type stop basket. A stop basket similar to those employed herein is disclosed in the patent to William W. Lasker, 1,780,621, issued November 4, 1930. The present machine makes use of four stop baskets, one of which is associated with each of the above four units and all of which are mounted in a common frame or tray 46 (see Fig. 3) supported between the side frames 8 of the head. Each basket contains 10 columns of digit stops 47 which are adapted to limit the movement of the usual actuating sectors 48 one of which is provided for each column of stops 47. In a ninety-column machine, such as the one now under discussion, each column of digit stops 47 is formed of five independently movable stops or bars and a normally ineffective zero stop 49. The manner in which the digit stops 47 operate to limit the movement of the sectors 48 and thereby position type sectors 51, secured to the sectors 48, is well known in the art and is set forth in the above Patent No. 1,780,621. Each of the stops 49 of each unit is individually and resiliently connected to a bell crank 52 loosely mounted on a shaft 53 supported between the side frames of the stop basket. Each bell crank lever 52 is tensioned, by means of a spring 54, to move in a clockwise direction to hold elevated its respective stop 49. As shown in Fig. 3, however, all of the levers 52 of each unit are normally held rocked against the tension of their springs 54 by a bail 55 supported between a pair of arms 56 (not shown) secured to a rock shaft 57. The zero stops 49 are thus normally held depressed. The pressure of bail 55 is, however, relaxed shortly after the start of each machine cycle by a cam (not shown) on the main head shaft 3, thus permitting all of the stops 49 to rise into effective engaging position. In those columns however in which a digit stop 47 is raised, a slide 58 (one of which is associated with each column of digit stops) is cammed to the right to hold the zero stop associated with that particular column depressed. During total strokes the shaft 57 is held rocked to disable all of the zero stops 49 for the duration of the total cycle. The means for controlling the shaft 57 during normal and total taking cycles does not form a part of the present invention and hence is not disclosed herein. Mechanism for this purpose is, however, disclosed in the application S. N. 156,304 and also in the French patent to Lasker No. 796,110, granted January 17, 1936.

Printing Mechanism

The actuating sectors 48 and the printing sectors 51 of each unit are pivoted to a common shaft 59 (Fig. 3) journaled between the side frames 8. A spring 61, tensioned between a rear extension of each type sector 51 and a spring anchor 62 tends to swing the type sectors 51 and their associated actuating sectors upward in a clockwise direction (Fig. 3) about the shaft 59. The sectors however are constrained to follow the movements of a bail rod 63 which is supported between the lower ends of a pair of arms 64 (one shown) pivoted on the shaft 59. One bail 63 and an associated pair of arms 64 is provided for each unit of the machine. The bail 63 normally holds the sectors 48 and 51 retracted against the tension of springs 61 and it is moved forwardly once for each cycle of the shaft 3 to permit all of the sectors 51 which are not retained by zero stops 49 to follow and position their type elements 65 to effect printing against the platen 66. On the return stroke of bail 63 all of the sectors 48 and 51 are picked up and restored to normal against the tension of springs 61. The type elements 65 are struck by hammers 67 released and operated in a manner well known in this type of machine. Certain actuating mechanism for operating the restoring bail 63 and for releasing the hammers 67 is shown in Figs. 3 and 4 driven from the main head shaft 3. Referring to Fig. 4 a cam 68 is secured to the righthand end of the shaft 3 and a pitman 69 is pivotally connected, at one end, to the outside surface of the cam 68 and at its other end to one arm 71 of a bell crank lever secured to a shaft 72. The shaft 72 is loosely mounted between the side frames 8 and it is evident that rotation of shaft 3 will impart a reciprocal rocking motion to the shaft 72, once for each cycle of the shaft 3, through pitman 69. The driving mechanism shown herein is the same as that used in the usual Powers machines and comprises generally a slotted lever 73 (Fig. 3), secured to the shaft 72, and to which is connected a long forwardly extending link 74 connected to one of the arms 64, and also, by means of the resilient extension 75 to an arm 76 on a shaft 77 of the hammer release mechanism. During the first 180° of rotation of the shaft 3 the shaft 72 is rocked in a clockwise direction (Fig. 3) and the link 74 is driven forwardly to rock the bail 63 upwardly and to rock the shaft 77 in a clockwise direction thus releasing the printing hammers 67. During the second 180° of rotation of the shaft 3, the shaft 72 is rocked in a counterclockwise direction thus permitting a heavy spring 78 (Fig. 3) to return the operating link 74 thereby restoring the bail 63 and the shaft 77 both to normal. The reciprocation of shaft 72 occurs once for each machine cycle but, as previously explained, the release of the type sectors is contingent upon the elevation of the digit stops 47 or the operation of the total taking mechanism. If all of the type sectors are held in the zero position none of the printing hammers 67 will be released since the printing hammers must be conditioned for operation by a moving type sector as is well known in this type of machine. The type sectors 51 are normally held retracted in full carry position with their first or zero type elements just below the printing line. At the start of each machine cycle the sectors follow the forward movement of the restoring bail 63 a short distance to place the zero element at the printing line. Printing mechanism identical to that just described is provided for each unit of the machine.

Accumulating Mechanism

Associated with each of the four printing units described above is a standard type accumulator operable by the actuating sectors 48 in a manner well known in the Powers tabulating machine. The three units of the present machine, First number, Last number, and Total operate in the same manner as the three similar units described in application S. N. 156,304. The following is a general statement of the function of each unit. Without regard to the previously mentioned extra unit which prints only identifying designation matter consider first the second unit from the left or First number unit. This unit is under the control of the Y wires 37A so that the serial number of each successive card is set up in the stop basket associated with this unit and the sectors 48 and 51 move forward on each machine cycle to accumulate and print each number. However, as pointed out in my previous application it is desired to effect printing in this unit only on the first machine operation following a total, thereby printing the number of the first card of a new sequence. In order to effect this operation a standard type of settable designating mechanism (fully described in the above application) is provided which holds the printing hammers 67 in this unit disabled during every machine operation except the one following a total. All accumulating and total taking operations performed in this unit are superfluous and ineffective. In connection with the above mentioned designation mechanism reference may also be had to the previously mentioned French Patent 796,110 for a disclosure of designation mechanism applicable to the present machine.

In the third unit from the left, or Last number unit it is desired to print only the number on the last card of a sequence. In order to obtain this result, mechanism, later to be described, is provided which enables the number on the first card of a sequence to be accumulated in this unit and then to count one into this same unit for each successive consecutively numbered card that passes through the machine. This unit is also provided with designating mechanism preset to permit printing therein only during total cycles.

The last or Total unit is under the sole control of the special wire 41. The wire 41 is positioned just under the number one digit stop 47 in the lowest order column of its associated stop basket, so that every time a card is sensed bearing the special control hole a one will be accumulated in the Total unit. This unit is permitted to print only on total taking operations, thereby recording the total number of cards in each sequence. In the machine of the previous application, two accumulators were associated with the Total unit. One was adapted to clear on every total operation while the other, known as a grand total accumulator, could be cleared only by a special control card. The present machine is shown with only the first mentioned accumulator, but, since both the old and the new machines are identical in general features of construction and operation, it is evident that a grand total accumulator could easily be mounted in the present machine.

Accumulating mechanism of the same general type and construction as that employed herein is disclosed in the patent to William W. Lasker No. 2,151,406, issued March 21, 1939. Its construction and operation is, briefly, as follows: Associated with each unit of the machine is a set of accumulator wheels 78, shown in Fig. 3, equal in number to the actuating sectors 48. The wheels 78 are loosely and independently mounted on a shaft 79 supported between a pair of arms 81 (one shown) pivoted to a fixed frame piece 82. The opposite ends of the shaft 79 are engaged by slotted cam arms 83 secured to the respective ends of a short shaft 84. A forwardly extending link 85 is connected to the upper end of the left-hand cam arm 83 and is slidably supported in any suitable manner at its forward end. The link 85 has a pair of oppositely disposed notches cut in its upper and lower edges near the link's forward end, which notches are adapted to cooperate with a pair of pins formed in opposite ends of a rock lever 86 secured to a shaft 87. An arm 88 also secured to the shaft 87 is connected at its lower end to a link 89 operable by a lever 91 fast on a shaft 92. The shaft 92 is a rock shaft adapted to be reciprocated once for each cycle of the main head shaft 3 through the cam 68 (Fig. 4) on the shaft 3, a lever 93 operable by cam 68, a forwardly extending link 94 connected to the lever 93 and an arm 95 connected to the link 94 and secured to the right-hand end of the shaft 92. Referring again to Fig. 3, it is evident that the motion of shaft 92 is transmitted through the pin carrying lever 86 and link 85 to the cam arms 83 causing them to rock with the shaft 92 to move the wheels 78 into and out of mesh with their respective racks 48. The time of reciprocation of the cam arms 83 is determined by the position of the link 85 and by which of the oppositely disposed notches cut therein is in effective cooperation with the lever 86. Mechanism is provided for shifting the link 85 during total cycles, including spring 96, link 97 and a lever 98 pivotally mounted on a rock shaft 99. An arm (not shown herein) is secured to the shaft 99 and is adapted, when the shaft is rocked, to depress the lever 98 and pull down the link 85; through spring 96. The rock shaft 99 may be called the front total shaft of the machine since it is rocked only during total cycles. The names for rocking the shaft 99 are old and well known in this type of machine and will be entered into briefly later in the description. During listing cycles of the machine the accumulator wheels 78 are out of mesh with the racks 48 during the forward stroke and in mesh on the return stroke. During total cycles the wheels 78 engage the racks 48 at the beginning of the forward stroke and move out of engagement at the beginning of the return stroke.

TOTAL TAKING MECHANISM

In all of the Powers tabulating machines, there is provided an automatic total control unit which initiates both total and grand total operations or total operations alone from a change in designating number or through any other suitable means made necessary by the particular function performed by each machine. A total control unit similar to the one employed herein is described in the U. S. Patent No. 2,237,908, issued April 8, 1941, in the name of William W. Lasker.

As explained in the timing diagram to follow, the present machine trips a total at a point slightly later in the machine cycle than is customary in the standard Powers tabulator. To compensate for this change in timing certain minor alterations in some of the cams of the total unit and the card feed cam have been made. In all its essential features of construction and operation, however, the total control mechanism of the present machine is the same as that described in the above mentioned patent to William W. Lasker, No. 2,237,908, a detailed description of which is given therein. The total control mechanism of the above application and the present machine is comprised in a normally inactive cam and ratchet unit adapted to be controlled by a pair of cams 101 and 102 (Fig. 7) secured to the shaft 2. Each cam 101 and 102 operates an associated push rod numbered, respectively, 103 and 104. Resting on top of the push rod 103 is a pawl arm 105 adapted to cooperate with a ratchet wheel 106 fixed on a shaft 107. The pawl arm 105 rises and falls with the push rod 103 but because of the arrangement of teeth on the ratchet wheel 106, the pawl is normally unable to advance the ratchet wheel and, therefore, cannot rotate the shaft 107. The push rod 104 cooperates with a pawl arm 108 adapted to advance a ratchet wheel 109 also secured to the shaft 107. The pawl arm 108 is, however, normally latched upward, out of the scope of movement of the push rod 104, by a latch 111 pivoted to a short shaft 112. As long as the latch 111 remains effective, therefore, the cam 102 is unable to operate the arm 108 and the shaft 107 remains stationary. Cooperable with the latch 111 is an arm 113 secured to a shaft 114. As viewed in Fig. 7, the rocking of shaft 114 rearwardly will disable the latch 111, permitting the arm 108 to drop downward until it limits against the top of the push rod 104. Now, upon the next elevation of the rod 104 by the cam 102 the pawl arm 108 will advance the ratchet wheel 109 and the shaft 107 one step. The one step of movement thus imparted to the shaft 107 so positions the first mentioned ratchet wheel 106 as to permit its advancement by its pawl arm 105 during each of the next two succeeding cycles of the cam 101. During the above mentioned three steps of movement of the shaft 107, a complete total taking operation takes place and at the end of this period the total control mechanism is completely normalized with the parts in their original rest position. As fully explained in the above mentioned Patent No. 2,237,908, the first step of the shaft 107 serves to disable the card feeding and sensing mechanisms and to keep the card stop 18 lowered to retain the card which tripped the total in the sensing chamber. The second step of operation of the shaft 107 serves to retain the above disabling mechanism in operative position and also to place the rise on a cam 115 (Fig. 8) beneath a roller on an arm 116 pivoted at 117 and connected to a link 118. The second step of shaft 107, therefore, pulls downward the link 118. As shown in Figs. 5 and 5A the link 118 extends upwardly and forwardly in the machine and is adapted to cooperate with an arm 119 secured to a sleeve 121 loosely mounted on a stud 121a supported by an auxiliary frame 122. Also secured to the sleeve 121 is another arm 123 connected through link 124 and an arm 125 to the previously mentioned total shaft 99. The downward pulling motion of the link 118 is thus imparted through the arm 119 to the shaft 99 to alter the timing of the front accumulator in the previously described manner and cause a total to be taken therefrom. The third step of movement of the shaft 107 normalizes the total control mechanism and conditions the machine for a positive sensing of the first card of a new group. The mechanism very briefly described above relates only to the means for releasing a total from the front accumulators. Additional mechanism for the purpose of taking a total from rear accumulators is illustrated but not described herein.

Returning now to the means for initiating an operation of the total control mechanism it will be seen that anything which rocks the shaft 114 (Fig. 7) counter-clockwise will disable the latch 111 to institute a total taking operation. As shown in Figs. 8 and 9 a two-arm lever 126 is secured to the right-hand end of the shaft 114 and an upwardly extending link 127 is connected to one arm of the lever. The link 127 is adapted to be pulled upwards in a manner later to be described when a break in the sequential order of the record cards occurs and it is evident that such a motion will rock the shaft 114 counter-clockwise to trip a total, as previously described. A standard change of designation mechanism is also provided in the present machine whereby totals may be tripped through the upper pin box slides 34 when it is desired to use the machine for another purpose than the verification of sequential orders. To this end an arm 128 is also fixed on the shaft 114 and a bail rod 129 is supported between the arm 128 and the lever 126. As shown in Figs. 5 and 8, the bail rod 129 lies directly in front, but beyond the scope of movement of all of the slides 34. Interponents 131 are adapted to be manually and selectively positioned between an associated slide 34 and the bail rod 129. In any column in which the interponent 131 is thus positioned it is evident that lateral movement of the slide 34 will cause the bail 129 to rock in a counter-clockwise direction (Fig. 5), thereby imparting a similar rocking motion to the total trip shaft 114.

CARD COUNT BLOCK

As mentioned earlier in the description there is provided certain mechanism associated with the Last number unit of the machine, which mechanism is adapted to cause the entry of a one into this unit for every machine cycle except the cycle immediately preceding a total, the total cycle itself, and the cycle immediately following a total. The cycle before a total is the usual idle cycle which always precedes a total taking operation, whereas the cycle after a total is the one in which the number of the first card of the new group is accumulated. Referring now to Fig. 3, it will be seen that slidably mounted on the rear of the translator 36 below the Last number unit is a plate 132 (see also Fig. 6A) hereinafter called the card count block. The upper end of the plate 132 is bent over the top of the translator 36 and lies just under the six lowest order zero stops 49 of the associated stop basket. In the upper right-hand edge of the block 132 (as viewed from the front of the machine), and directly beneath the zero stop 49 of the lowest order column, a notch 133 is cut. In addition to the notch 133, the block 132 is also formed with a projection 134 which underlies the number one stop bar of the lowest order column of stops 47. The block 132 is spring tensioned downward, and with the machine in rest position it occupies the position shown in Fig. 3. If, however, the block is caused to move upwards (by means soon to be described), the result will be a positive elevation of all of the zero stops 49, except that of lowest order, and the elevation of the number one stop 47 of the lowest order column. Now, as the sectors are released, through the operation of bail 63, only the accumulating sector 46 and the type selector 51 of the lowest order are permitted to advance beyond the zero position. The sector 46 will limit in the usual manner against the upraised "one" stop 47 and on its return stroke a one will be counted into the associated accumulating wheel 78. As previously mentioned printing is effected in this unit only on total strokes. The projection 134 on block 132 overlies a portion of the number one interponent pin 56 in the lowest order column of this unit. As shown in Fig. 3, the portion of this pin 56 which the projection 134 overlies is cut away in such a manner as to permit the pin to operate independently of the block 132. Thus the number one stop 47 in this column may be operated either through its associated translator wire 37B or through the card count block 132. As shown in Figs. 3 and 5 the card count block 132 is connected, through an arm 135, to a shaft 136 supported at the rear of the translator. The shaft 136 is rotatably mounted between a pair of brackets 137 (one shown) one of which is fastened at either end of the rear of the translator. The arm 135 is fast on the shaft 136 and it is evident that, if the shaft is rocked in a clockwise direction, as viewed in Fig. 3, the block 132 will be elevated to perform the function stated above. The shaft 136 is adapted to be rocked through the medium of a cam 138 secured to the constantly rotating shaft 3. As shown in Fig. 3, the cam 138 is formed with a single low spot or depression 139 and is adapted to cooperate with a roller bearing arm 141 pivoted at 142 to the rear of a bracket 143 fastened to the previously mentioned stop tray 46. The arm 141 extends forwardly of its pivot 142 and overlies a stud 144 formed on the upper end of an arm 145 fast on the shaft 136. The arm 141 is urged to move in a counterclockwise direction (Fig. 3) about its pivot 142, to maintain its roller in contact with the periphery of the cam 138, by means of a spring 146 tensioned between a stud 147 on the arm 141 and another stud fixed to the stop tray 46. Thus, it will be seen that, unless otherwise influenced, the arm 141 will move in a reciprocating rocking motion, due to the formation of cam 138, once for each cycle of the shaft 3. This motion is transmitted through the arm 145 to the shaft 136 to elevate the card count block 132 in the manner described above. As shown in Figs. 4 and 9, however, mechanism is provided whereby the shaft 136 may be latched in rocked position upon its first actuation following a total stroke in order that the block 132 will remain elevated so long as the record cards follow one another in sequential order. Secured to the extreme right-hand end of the shaft 136, and positioned just outside the right-hand bracket 137, is a downwardly extending finger 148. Pivoted at 149 on the bracket 137 is a second arm or finger 151 positioned below but in the same plane as the finger 148. The arm 151 is urged, by means of a spring 152, to move in a clockwise direction (Fig. 9) and a forwardly extending portion of the arm is adapted to engage the finger 148. It is evident that if the shaft 136 is rocked in a clockwise direction (Fig. 4) the arm 151 will be permitted to move clockwise under tension of its spring to place the forwardly extending portion of the arm beneath the finger 148. The shaft 136 is thus held rocked in operated position to keep the block 132 raised in order that a "one" may be counted into the accumulator for each cycle of the machine. A forwardly extending link 153 (Fig. 9) is connected to the arm 151 and operates under certain conditions of operation, later to be described, to disable the arm.

Due to the fact that the mechanism of the invention is mounted in a ninety-column Powers type machine mechanism similar to that shown in my previous application S. N. 156,304 is provided in order to prevent the elevation of the nine stop 47 of the lowest order column in the Last number unit in all machine operations except the one following a total. It should be borne in mind that while the card count block 132 is up and a "one" is being counted into the accumulator associated with this unit, the digit stops 47 are being set up in the usual manner as each successive card is sensed. According to the well known construction of the ninety-column Powers stop basket the five digit stops 47 of each column represent the odd numerals one, three, five, seven, and nine (right to left as viewed in Fig. 3) and an even number is obtained by elevating the digit stop representative of the odd numeral which is one less in value than the desired even numeral and by elevating in conjunction with this stop the nine stop of the same column. For example, a "two" would be obtained by elevating the "one" stop and the "nine" stop. Therefore, it is necessary in the present machine to disable the "nine" stop of the lowest order column after the number of the first card of a new group has been accumulated. As shown in Fig. 5 the "nine" wire 37B associated with the lowest order column of stops in the Last number unit is shorter than the remainder of the wires in the translator and is supported at its upper end by a bracket spaced below a fixed guide plate 154 and secured thereto by means of a pair of sleeves 154A (see Fig. 6) rigidly connecting the plate 154 and the above bracket. Positioned directly above this special wire 37B is a pin 155 slidably mounted between two more auxiliary brackets also supported by the sleeves 154A. The upper end of the pin 155 rests directly beneath the forward end of a lever 156 extending horizontally through the translator. The forward end of the lever 156 is formed with a toe, which toe is normally positioned just under an interponent pin 50 the upper end of which underlies the "nine" stop 47 of the above mentioned lowest order of stops. With the mechanism positioned as shown in Fig. 5, it will be seen that the elevation of the special "nine" wire 37B will be transmitted through the pin 155 and lever 156 to raise the "nine" stop in the usual manner. The rear of the lever 156 is, however, resiliently connected to an arm 157 secured to the shaft 136, and it is evident that a clockwise rocking motion of this shaft will cause the lever 156 to shift forwardly thereby moving the toe of the lever out of cooperative relation with the interponent 50. Inasmuch as the shaft 136 is immediately latched in operating position, the special "nine" wire may subsequently be freely operated without affecting the "nine" stop 47. As explained more clearly in the description to follow the shaft 136 is rocked just before the start of the second machine cycle following a total. The number of the first card of a new group is entered into the accumulator on the first cycle following a total.

As previousely mentioned the mechanism for comparing the serial number of each successive record card with that of its predecessor, and for tripping a total when the sequential order of the record cards is broken is mounted at the front of the machine in its mid-section. The function of the comparing mechanism of the present machine is the same as that disclosed in my application S. N. 156,304. Referring now to Figs. 6 and 10 it will be seen that the previously mentioned pin box secured to the front of the translator 36 at its right-hand side is comprised of a pair of plates 158 and 159, held in rigid alignment and a third plate 162 spaced a short distance in front of the plate 159 and fastened thereto by screws 163 the unit being secured to the translator 36 by screws 161 (Fig. 6). The wires 37C operated by the wires 37 extend through an opening in the frame of the translator and are secured at their forward ends in the plate 158. Since the machine of the invention is built to operate on cards having serial numbers of six digits or less, there are six columns of wires 37C. Each column of wires represents in order from top to bottom, the numerals nine, seven, five, three and one. There are, however, as is shown in Fig. 10, six wires to each column. The lowermost wire in each column, indicated herein at 164, is a zero wire operated from a zero hole punched in the card. There are only six zero wires 164 in the entire translator (one for each column in the pin box) and these six wires are associated with the zero positions in the field of the card which contains the serial number. For a purpose later to be explained a "zero" is punched in each column of this field wherein a digit of the serial number does not appear. For example if the serial number of a card is 785 then the three extra columns to the left of the 7 would be punched with zeros, this field being comprised of six columns as previously mentioned. A zero is also punched if it appears in the serial number itself.

As shown in Fig. 10 there is positioned in front of each column of wires 37C and 164 a column of pins 165 supported between the plates 159 and 162. The operation of any wire 37C or 164, therefore, will cause a forward movement (to the left as viewed in Fig. 10) of its associated pin 165. The special wire 42 which also extends into the above pin box operates a similar pin 165A, supported between the lower left-hand corners of the plates 159 and 162 (Fig. 6) in a manner similar to the above.

COMPARING UNIT
(Decoding pin box)

The comparing mechanism of the machine is controlled through the medium of the pins 165 and is contained in a unitary structure mounted directly in front of the plate 162 of the pin box and secured to the base casting 5. The comparing unit is formed of a pair of frame plates 166 and 167 (see Figs. 9, 11, 12, and 13) between which is mounted the various counting and sensing mechanisms. As shown in Fig. 11 the frame piece 166 is bent inward at its lower end and is rigidly mounted on the base casting 5. The plate 166 is further held in a rigid position by means of a bolt (not shown) connecting a forward extension of the plate to the translator frame. The plate 167 is held in rigid alinement with the plate 166 by means of tie rods 160 and various shafts to be noted with more particularity in their proper place in the description. Cut in the front edge of each plate 166 and 167 is a horizontally extending slot 168 (Figs. 12 and 13). Supported between the slots 168 is a pin box 169 (Figs. 14 and 31) formed with lateral oppositely extending studs 171 adapted to extend through the respective slots 168. The forward and rear ends of the box 169 are enclosed by plates 172 (see also Fig. 15) between which are supported six columns of pins 173, there being ten pins to each column. The pin box 169 is thus loosely mounted between the side frames 166 and 167 and mechanism is provided whereby it may be reciprocated forwardly and rearwardly once for each cycle of the machine. As shown in Figs. 12 and 13 the respective studs 171 extend beyond their frames 166 and 167 and each is cradled in the upper end of an arm 174 secured to opposite ends of a shaft 175 loosely mounted between the side frames. Referring now to Figs. 1, 9, 12, and 16 it will be seen that fast on the right-hand end of the shaft 175 is a forwardly extending arm 176 connected at its far end to a downwardly extending link 177. The link 177 is connected at its lower end (Figs. 1 and 16) to one end of a lever 178 pivoted at its mid point to a shaft 179 (see Fig. 17) supported at one end by the inner framework of the machine and at its other end by a bracket 181 (Fig. 1) fixed to the base plate 4. At its other end the lever 178 bears a roller adapted to ride the periphery of a cam 182 secured to the main drive shaft 2. As shown in Fig. 16 the cam 182 is formed with a single rise 183 so that the lever 178 will be rocked in a clockwise direction about its pivot 179 once for each cycle of the shaft 2. This clockwise motion of the lever 178 is imparted through the link 177 and arm 176 to the shaft 175 to rock the arms 174, and thereby the pin box 169, rearwardly. A pair of springs 184 (Figs. 12 and 13), tensioned between the oppositely extending studs 171 and studs on the respective frame plates 166 and 167, serve to urge the pin box 169 to retain a retracted position and to maintain the roller on lever 178 in contact with its cam 182. The pin box 169 is positioned directly in front of the previously mentioned pins 165 on the translator and once for each cycle of the machine the pin box 169 is briefly moved rearwardly under the control of cam 182 to enable its pins 173 to contact the pins 165.

Referring again to Fig. 10 it will be seen that each pin 165, except the "nine" and "zero" pins, has a button 185 formed on its forward end. As mentioned above there are ten pins 173 to each of the six columns, the ten pins representing in order from top to bottom the numerals "nine" to "zero." The reciprocation of the pin box 169 occurs shortly after the translator wires 37 are raised so that as each successive number is set up on the pins 165 the pin box 169 moves rearwardly to permit the extended pins 165 to operate their associated pins 173. The buttons 185 integral with the seven, five, three, and one pins 165 are of a sufficiently large diameter to press upon two pins 173 of one column at the same time. For example if a five pin 165 is extended then both the five and six pins 173 of the associated column will be pressed forwardly. An even number is represented on the pins 165 by the odd number of next lower numerical value extended in cooperation with the nine pin. A "six," for example, is obtained by extending the five and nine pins 165 of the same column. In order that the pins 173 may perform a function soon to be described they are locked in operated position for approximately the duration of one machine cycle.

As viewed in Figs. 14, 18, 19, and 20 each column of pins 173 has three locking slides associated therewith. One of the locking slides 186 (Figs. 14 and 18) is positioned to the right of each column of pins and cooperates with extrusions 187 extending to the right of each odd numbered pin 173 and the zero pin. As shown in Fig. 18 the extrusions 187 extend through locking slots 188 cut in the slide 186 said slots being formed with shoulders 189. Each slide 186 is tensioned downward by means of a spring 191 so that it is evident that each time an odd numbered pin 173 is pressed forwardly a locking slide 186 will tend to engage the operated pin and hold it extended. As shown in Figs. 18, 19, and 20 all of the number nine pins 173 are shorter in length than their associated pins in the same column. The nine pins are supported at their forward ends by a bracket 180 and operate in a manner soon to be described. Associated with each column of pins 173 on their left-hand side is another locking slide 192 (Figs. 14 and 19) cooperating with extrusions 193 formed on the left-hand side of all of the even numbered pins 173 and the nine pin. As shown in Fig. 19 the extrusions 193 extend through locking slots cut in each slide 192 in much the same manner as the above extrusions 187 on the odd numbered pins 173. However the extrusions 193 normally lie in the left-hand side of their associated slots (Fig. 19) whereas the shoulders formed therein are on the right-hand side of the slot. Therefore unless the slides 192 are released to move to the left, in a manner soon to be described, the even numbered pins 173 will not be locked when operated. The third slide associated with each column of pins 173 is also positioned to the left of the column and is numbered 194 (see Figs. 14 and 20). As shown in Fig. 20 each slide 194 is formed with cams slots 195 through which extend the extrusions 193 on the even numbered pins 173. The right-hand end of each slide 194 (Fig. 20) extends out of the pin box 169 and is formed with a forwardly extending portion 196 lying parallel to the pins 173. Connected by pin and slot connection to the forward end of the extension 196 is a plate 197 tensioned rearwardly by means of a spring 198 connecting plate 197 and extension 196. The slides 194 are urged downwardly by means of springs 199. These springs 199 press down on studs 199A projecting from the side of extension 196. As shown in Fig. 20 the upper right-hand corner of the pin box 169 is broken away and through this opening extend the several plates 197, the lower rear edge of each being positioned just in front of its associated nine pin 173, and the forward end thereof lying parallel to the forward ends of the remainder of the pins 173 of the unit. The number nine pins are thus adapted to operate their associated plates 197 to project them forwardly to serve the same purpose as the operation of the regular pins 173. From the formation of the cam slots 195 cut in the slides 194, however, it will be seen that the operation of any even numbered pin 173 will cause its associated slide 194 to move to the right (as viewed in Fig. 20) to place the plate 197 connected thereto out of the path of the nine pin.

In the construction of the pin box as thus far described it will be seen that each time a number is set up on the pins 173 the pins of each column will be extended in various combinations. That is, if an odd number is being set up, both the desired odd number pin and the next higher even pin will be extended. If an even number is set up, the desired even number pin, the next lower odd number pin and the nine pin of the same column will all be extended. It is necessary, however, that only one pin 173 per column be locked in operated position. To accomplish this end the slides 186, 192, and 194 are constructed in the following manner. As shown in Fig. 14 each of the number nine pins 173 have two extrusions, 187 and 193 respectively, extending from opposite sides of the pin. The extrusion 187 of each pin extends through a cam slot 201 formed in the slide 186 and which is adapted, when the nine pin is operated, to cam the slide 186 to the left, as viewed in Fig. 18. Therefore, if the nine pin and an odd numbered pin of the same column are operated together, the locking shoulders 189 in the slots 188 will be prevented from performing their normal function of locking the extended odd numbered pins. The extrusion 193 of each of the nine pins extends through both of the slides 192 and 194. The slide 192 is formed with a cooperating slot 202 (see Fig. 19) formed in the shape of an inverted L. The extrusion 193 normally lies in the narrow rear portion of the slot 202 and serves to retain the slide 192 in the position shown in Fig. 19 with the locking slots formed therein out of cooperative relation with the extrusions 193. Thus an operation of an even numbered pin 173 without a simultaneous operation of the nine pin of the same column will merely be an ineffective movement and the pin will not be locked. If, however, the nine pin is extended in conjunction with an even numbered pin the extrusion 193 on the nine pin will enter the enlarged portion of the slot 202 thereby permitting the slide 192 to move to the left (Fig. 19) under tension of its spring 191 to lock the operated even numbered pin in extended position. Also cooperating with the extrusion 193 on each of the number nine pins is a slot 203 formed in the slides 194 (see Fig. 20). The slots 203 are open, without either cam surfaces or locking shoulders and serve no function save to provide an opening for the extrusions 193. Any number nine pin 173 may thus be operated alone to project forwardly its associated plate 197. The zero pins 173 cooperate with the slides 186 and are locked thereby each time they are operated. Individual spring tensioning means, comprising a coil spring 204 (Figs. 18, 19, and 20) surrounding each of the pins 173, is provided to urge the pins rearwardly. If a pin is not locked in extended position, therefore, it will be returned to normal as the pin box 169 leaves the translator pins 165. Mechanism is provided whereby the slides 186, 192, and 194 may be retracted once for each machine cycle to release the extended pins 173 just prior to the time a new number is set up thereon.

As shown in Figs. 9, 13, 15, and 21 a bail rod 205 is positioned just beneath the lower rear edges of all of the slides 186, 192, and 194, and is supported between the upper ends of a pair of arms 206 (one shown) secured to opposite ends of a collar 207 loosely mounted on a shaft 208 pivotally supported between the side frames 166 and 167. Fast on the right-hand end of the collar 207 is an arm 209 (Figs. 9 and 13) connected to a downwardly extending link 211. As viewed in Figs. 1, 17, and 21 the link 211 is connected at its lower end to one end of a lever 212 secured at its other end to a collar 213 (Fig. 17) mounted on a stud (not shown) integral with an auxiliary frame piece 210 (see Fig. 1). Fast on the outer end of the collar 213 is an arm 214 bearing a roller at its far end adapted to follow the contour of a cam 215 secured to the shaft 2. The roller on the arm 214 is forced to remain in contact with its cam 215 by reason of the action of springs 191 and 199 working on the slides in the pin box so that it is evident that once for each cycle of the shaft 2 the lever 214 will be rocked in a counter-clockwise direction (Fig. 21) to pull downward the link 211 to rock the arms 206 and elevate the slides 186, 192, and 194 through the bail rod 205. The pins 173 are thus free to return to normal and receive a new set up from the pins 165.

For each cycle of the machine, therefore, the decoding pin box 169 is reciprocated horizontally a short distance through the counting unit. As will be explained in greater detail in the timing diagram to follow the pins 173 of the pin box receive their set up from the translator pins 165 at the start of each machine cycle and then the pin box moves forwardly to enable the extended pins to position certain racks (later to be described). Near the end of each machine cycle the locking slides retaining the pins 173 are retracted and the pin box again moves rearwardly to receive a new number set up.

RACK SET UP AND RETAINING MEANS THEREFOR

As shown in Figs. 11 and 15 there are rigidly mounted between the side frames 166 and 167 two shafts 216 and 217. Loosely mounted for vertical reciprocation on the shafts 216 and 217 are six racks 218 formed with slots 219 and 221 through which extend the respective shafts 216 and 217. The racks 218 are urged downward in the position shown in Fig. 15 by means of springs 222 one of which is tensioned between an arm 220 secured to the upper end of each rack 218 and a tie rod 223 mounted between the side frames 166 and 167.

Upon the institution of a total taking operation all of the racks 218 are raised to their highest elevated position, through means later to be described, and on the first machine cycle following a total the first number of a new sequential order is set up on the pins 173. Then after the pin box 169 has moved to its forward position the racks 218 are permitted to descend. The racks 218 are positioned forwardly of and between the several columns of pins 173 and each rack is provided with a stop plate 224 adapted to cooperate with the pins 173 of its associated column. The plates 224 are mounted on the right-hand side of the racks 218 by means of pin and slot connections and are tensioned towards the rear of the machine by means of springs 225. The length of the plates 224 is exactly the same as the width of the racks 218 and the rear end of each plate lies just in front of its associated column of pins 173. Now, during the descent of the racks 218 certain of the plates 224 will limit against extended pins 173 thereby halting the downward movement of its associated rack 218. Cut in the upper rear edge of each rack 218 are ten detent teeth 226 adapted to be engaged by an associated detent pawl 227 pivoted on a shaft 228 supported between the side frames 166 and 167. Springs 229, one of which is tensioned between each of the detent pawls 227 and a tie rod 231 supported between frames 166 and 167, serve to urge the pawls 227 in a counter-clockwise direction (Fig. 15) into engagement with their racks 218. Through means later to be described, however, the detent pawls 227 are held disabled during the period of extreme elevation of the racks 218 and are permitted to engage their racks again only after the plates 224 have limited against the extended pins 173 to set up the new number. As shown in Fig. 15 the distance between the bases of the detent teeth 226 is approximately equivalent to the diameter of one pin 173. When the detent pawls reengage those racks 218 which are limiting against extended pins 173 the nose of each pawl comes to rest between the rack teeth 226 at a point just above one of the teeth with a distance equal to the diameter of a pin 173 separating the pawl nose and the next higher tooth 226. Now, upon the retraction of the locking slides in the pin box the pins 173 return to normal thereby permitting the racks 218 which they have held elevated to drop downward the distance required for the lower face of the next higher tooth to limit against the detent pawls 227. At this time it is evident that the rearmost end of each plate 224 is directly opposite the originally extended pin 173 against which it previously limited.

All of the racks 218 are thus set in accordance with the first number of a new sequential order. Before the pins 173 are set up with the number of the next card, mechanism is provided for increasing by one the numerical representation of the racks 218 by feeding the rack 218 of lowest order one tooth space upwards. If, after the above operation, the new number as represented by the extended pins 173, is higher by one than the previous number then all of the plates 224 will be in exact alignment with the operated pins 173 and will be projected forwardly thereby against the tension of their springs 225. During the time the plates 224 are projected forwardly a comparing operation takes place in order to determine the relative arrangement of the plates 224 and the pins 173. If, as described above, the plates 224 and pins 173 are in exact alignment, no further operation takes place. The pins 173 will be retracted, the numerical representation of the racks 218 will again be increased by one and the third record card will be sensed. If, however, the plates 224 and pins 173 are not identically arranged, the comparing mechanism will cause a total to be tripped; thereby clearing the machine and resetting it for a new sequential order. It will thus be seen that the racks 218 and the pins 173 constitute separate number representing devices. The pins 173 are set from individual index positions of the cards, while the racks 218 are set under the control of the pins 173 and through the cooperation of several associated mechanisms.

RACK FEEDING

The rack feeding mechanism is controlled from a cam on the main shaft and operates once for each cycle of the machine. As shown in Fig. 15 the lower rear edge of each rack 218 has ten teeth 232 cut therein similar to the teeth 226. Fixed to the left-hand side of each rack 218 is a plate 233 positioned alongside of the upper "nine" teeth 232. Adapted to cooperate with the teeth 232 are six feed pawls 234 (see also Fig. 22) positioned to the rear of the rack and individually mounted on a shaft 235 supported between forwardly extending arms of a U-shaped operating member 236. As shown in Fig. 15 the left-hand arm of member 236 is pivoted at 237 to the inside of the left-hand frame member 167. The right-hand arm of member 236 is secured to a shaft 238 (see Fig. 23) rotatably mounted in an extension of the side frame 166. Springs 239 (Fig. 15) tensioned between forward extensions of the arms on member 236 and the previously mentioned tie rod 223 serve to urge the member in a counter-clockwise direction as viewed in Fig. 15. Referring now to Figs. 9, 12, and 24 it will be seen that a forwardly extending arm 241 is fixed to the outer end of the shaft 238 and is connected to the upper end of a downwardly extending link 242. The lower end of the link 242 is connected to one end of a lever 243 (see also Figs. 1 and 17) pivoted at its mid point to the previously mentioned shaft 179 and bearing at its other end a roller adapted to follow the contour of a cam 244 fast on the shaft 2. As shown in Fig. 24 the cam 244 is formed with a single low spot or depression 245. It is evident that as long as the roller on lever 243 dwells on the high surface of the cam 244 the operating member 236 will remain inactive in the position shown in Fig. 15. Once each machine cycle, however, the roller will be permitted to drop into the low spot 245 under the tension of the springs 239 thereby causing the feed pawls 234 to move upwardly to advance one or more of the racks 218 in the following manner.

As shown in Fig. 15 the several pawls 234 are tensioned to move in a counterclockwise direction about their pivot 235 by means of springs 246 tensioned between lower extensions of the pawls and the rear of the operating member 236. In order that the pawls may normally be disengaged from the racks 218, however, a plate 247, fastened to the frame member 167, is provided. The pawls 234 normally rest with their respective noses bearing against the upper rear surface of the plate 247 and are adapted, when the member 236 is operated, to move off of the retaining plate to bear against the rack 218. The several pawls 234 are so arranged that as they move off of the plate 247 only the pawl of lowest order will be permitted to drop into engagement with the teeth 232 on its associated rack 218. The feed pawl of second lowest order and all those to the left of this pawl are so positioned that they will be engaged by the previously mentioned plate 233 of the next lower order rack 218, and so be prevented from engaging their associated teeth 232. The lowest order rack 218 will thus be fed alone one step for each cycle of the machine as long as the sequential order of the record cards is unbroken. In order that the racks 218 may retain a correct decimal representation at all times it is evident that on the last or tenth step of movement of the lowest order rack (assuming that this rack started at zero) the rack of next higher order must be fed one step at the same time and then the lowest order rack must be returned to zero to begin a new series of steps. Immediately after the ninth step of the lowest order rack 218, therefore, the feed pawl 234 of next higher order is conditioned to drop off of its disabling plate 233 to engage a tooth 232 of its associated rack 218 upon its next upward movement. Now upon the next step of movement of the member 236 both racks 218 of first and second lowest order will be simultaneously advanced one step. In order that the rack of lowest order may be returned to normal after its tenth step of movement a stud 248 is positioned on the right-hand side of the rack. The stud 248 cooperates with a forward extension of the associated detent pawl 227 to rock the pawl out of engaging position on the tenth step of movement of the rack. The upper rear surface of the detent pawl is formed with a notch 249 adapted to be engaged by one arm of a latch 251 pivoted to a shaft 252 loosely supported between the side framess 166 and 167. The latch 251 is urged in a clockwise direction (Fig. 15) by means of a spring 253 and will retain the pawl 227 in disabled position until it is itself disabled, when the rack has returned to zero, by a second stud 254 positioned on the upper end of the rack 218. Each rack 218 is provided with studs 248 and 254 and an associated latching lever 251 so that the above described carry operation, whereby a rack of higher order is fed one tooth space for every ten steps of the rack of next lower order, is effected throughout the entire set of six racks. It is evident however that inasmuch as the several racks 218 are originally set up according to a defi- nite serial number they will be variably arranged when first operated by the member 236. Furthermore one or more of the racks may originally be positioned with its plate 224 opposite the nine pin 173. The feed pawl 234 of next higher order would thus be free to drop behind the plate 233 to advance its rack on the first operation of member 236. Therefore a means is provided additional to the plates 233 for holding ineffective all of the pawls 234 to the left of the last operated pawl. Referring to Fig. 22 it will be seen that integral with each of the pawls 234 except the two of lowest order is a stud 255 projecting in a right-hand direction from the pawl and resting in or overlying a cut out portion 256 of the next lower order pawl. Thus it may be seen that pawl 234 of lowest order may rock into engagement with its rack 218 at any time; that the pawl of second lowest order is prevented from engaging its rack only by the plate 233 of the lowest order; and that the remainder of the pawls are held ineffective by the studs 255 until released by the rocking of the next lower order pawl.

COMPARING OR FEELER MECHANISM

The mechanism previously noted for comparing the relative arrangement of the plates 224 and the pins 173 is also controlled from a cam on the main shaft 2 and operates once for every machine cycle except the cycle immediately following a total, at which time the plates 224 are limiting against extended pins 173 to set up a new number. As shown in Figs. 11 and 15 a feeler link 257 is positioned directly in front of each of the plates 224. The upper end of each link 257 is pivotally connected to one end of an arm 258 loosely mounted on a shaft 259 fixed betwen the side frames 166 and 167. The lower end of each link 257 is pivotally connected to one arm of a bell crank lever 261 loosely mounted on a sleeve 262 surmounting a shaft 263 supported for free rotation between the frames 166 and 167. The sleeve 262 is supported independently of the shaft 263 by means of a pair of arms 264 dependent from a shaft 265 and a tie rod 266 both of which are fixed between the side frames of the unit. Each of the bell crank levers 261 is urged to move in a clockwise direction (Fig. 15) about its pivot 262 by means of a spring 267 tensioned between the forwardly extending arm of each lever and the tie rod 266. The levers 261 are normally held in the position shown in Fig. 15, however, against the tension of springs 267 by means of a bail rod 268 overlying the upper forward edges of all of the levers 261 and supported between a pair of bell crank levers 269 secured to the shaft 263. The bail rod 268 is caused to remain in contact with the levers 261 by means of a pair of light springs 271 tensioned between upwardly extending arms of the levers 269 and studs 272 integral with the respective side frames 166 and 167 (see Fig. 11). Through a separate means, soon to be described, the bail rod 268 is held locked in the position shown in Fig. 15. Once for each cycle of the machine, however, this locking means is disabled thereby rendering the bail rod ineffective to prevent the levers 261 from rocking under tension of their springs 267. It will be recalled that when the machine is in sequence, that is when the record cards follow one another in sequential order, the operated pins 173 and their associated plates 224 are in exact alignment and the latter will be projected a short distance forward by the former. The disabling of the abovementioned locking means for preventing the rocking of levers 261 occurs at a time when the plates 224 are extended under pressure of the pins 173. Each plate 224, when extended, is positioned with its front edge contacting the rear edge of its associated link 257. Now, when the levers 261 are freed and attempt to move under tension of their springs 267 they will be prevented from such movement by the extended plates 224. Before the pins 173 are returned to normal the bail rod 268 is again locked in retaining position and will not be released again until the following cycle. It is evident that when the machine is out of sequence one or more of the pins 173 will be operated without causing a corresponding actuation of their associated plates 224. Thus one or more of the links 257 will be permitted to move rearwardly to trip a total in the following manner.

TOTAL TRIP

As shown in Figs. 9, 11, 12, and 25 an arm 273 is loosely mounted on the shaft 263, near its right-hand end, the arm 273 being connected at its free end to a downwardly extending link 274. The lower end of the link 274 is connected to the forward end of a lever 275 (see also Figs. 1 and 17) pivoted at its mid point to the shaft 179 and bearing at its opposite end a roller adapted to ride the periphery of a cam 276 secured to the shaft 2. As shown in Fig. 25, the cam 276 is formed with a single low spot 277 so that once for each cycle of the shaft 2, the lever 275 will rock briefly in a counter-clockwise direction to pull downward the link 274 and to rock the arm 273 a short distance in a clockwise direction about its pivot 263. Referring now to Fig. 12 it will be seen that secured to the outer end of the shaft 263 is a finger like arm 278 the rear end of which overlies a stud 279 integral with the arm 273. While the roller on lever 275 dwells upon the raised surface of the cam 276 the stud 279 will hold the finger 278, and thereby shaft 263 and bell crank levers 269 in locked position, thereby preventing the rocking of levers 261. Once for each machine cycle, however, the pressure exerted by cam 276 is relieved thereby releasing the finger 278 to permit it to rock in a clockwise direction (Fig. 12) or remain in its original position according to whether the machine is out of or in sequence. If in sequence, that is if all of the plates 224 (Fig. 15) are extended, none of the links 257 will be permitted to move rearwardly and the shaft 263 will not be rocked. If out of sequence one or more of the links 257 will move rearwardly thereby causing the shaft 263 to rock in a clockwise direction, through levers 261 and bail rod 268. As shown in Figs. 11 and 13 there is secured to the left-hand end of the shaft 263 bell crank 281 the lower end of which is connected to the previously mentioned link 127 connected at its lower end to the two armed lever 126 (see Fig. 8). As previously mentioned anything which pulls the link 127 upward to rock the lever 126 will institute a total taking operation. It is evident, therefore, that a counterclockwise rocking motion of the shaft 263 (as viewed in Fig. 13) will cause a total taking operation to be performed in the machine.

Also provided in the present machine is an additional blocking means for preventing an operation of the shaft 263 when the machine is not being used for the verification of sequentially numbered record cards. As shown in Figs. 11 and 13 there is secured to the left-hand end of the previously mentioned shaft 208 an upstanding arm 282 to the upper end of which is connected a link 283 connected at its opposite end to one arm of a bell crank lever 284. The lever 284 is pivoted to a stud 285 integral with the frame piece 167 and its other arm bears a stud 286 adapted to cooperate with a shoulder formed in the upper end of the abovementioned bell crank 281. With the above described linkage positioned as shown in Fig. 13 it is evident that the stud 286 will prevent the rocking of shaft 263. A spring 287 tensioned between the lever 284 and a stud on the frame 167 urges the lever 284 into blocking position. In normal machine operation, however, the arm 282 is adapted to be pressed rearwardly, to disable the lever 284, through the medium of the special pin 165A controlled by the special translator wire 42. It will be remembered that this special pin 165A (Fig. 6) is located in the lower left-hand corner of the translator pin box and is, therefore, positioned directly opposite a bent over ear 282A formed on the arm 282. Operation of wire 42 will thus extend the special pin 165A to rock lever 282 and its associated linkage out of normal position against the tension of spring 287. The wire 42 will remain continually effective as long as the special control hole appears in the record cards.

As previously noted a means is also provided for rendering the comparing mechanism ineffective to trip a total during the machine cycle immediately following a total since it is during this cycle that a new number is set up on the racks 218. As shown in Figs. 11 and 12 an arm 288 is secured to the shaft 263 near its right-hand end. The arm 288 extends downwardly from the shaft 263 and has its lower end positioned slightly above and to the rear of a lever 289 fast on a shaft 291 which shaft is pivotally supported between the extreme forward ends of the frames 166 and 167. The lever 289 and its shaft 291 are adapted to be rocked upward in a counter-clockwise direction (Fig. 12), through means soon to be described, during the last portion of the total cycle and the first portion of the next following cycle. With the lever 289 in its elevated position the arm 288 limits against the rear edge of the lever and when rack comparing occurs during this cycle the shaft 263 will be prevented from rocking. As pointed out in the timing diagram to follow the rack comparing operation takes place during the early part of each cycle and therefore occurs at a time when the lever 289 is in elevated position.

NEW NUMBER SET-UP

As shown in Figs. 9, 11, and 12 there is secured to the right-hand end of the shaft 291 a rearwardly extending arm 292 bearing a stud 293 at its outer end. The stud 293 passes through a slot 294 cut in a plate 295 fastened to the upper end of a downwardly extending link 296. As shown also in Figs. 1, 17, and 26 the link 296 is secured to a second link 297 connected at its lower end to a lever 298 pivoted to the previously mentioned shaft 179. Mounted on the opposite end of the lever 298 is a roller adapted to follow the contour of a cam 299 fast on the shaft 2. A spring 301, tensioned between the plate 295 and a stud on the frame 166, serves to maintain the roller on lever 298 in contact with its cam 299. The cam 299 is adapted to move the lever 298 positively in a reciprocable rocking motion once for each cycle of the shaft 2, thereby imparting reciprocable vertical movement to the links 297, 296, and the plate 295. As shown in Fig. 12, the slot 294 formed in the plate 295 is shaped somewhat in the form of an inverted L, that is, the slot extends forwardly at its upper end to form a shoulder 302 whereas its lower end is cut only to a sufficient width to enable the stud 293 to be passed therethrough. During total taking operations, however, mechanism soon to be described is provided for shifting the plate 295 rearwardly in order that the stud 293 may be engaged by the shoulder 302 formed in slot 294. It is evident that the shifting of plate 295 may occur only when the plate is in its extreme lowest position. Then, it will be seen that as the plate 295 begins its upward travel, the arm 292 and the shaft 291, to which the arm is secured, will be rocked in a counter-clockwise direction, as viewed in Fig. 12, until the plate reaches its extreme elevated position. Referring now to Figs. 11 and 15 there is secured to the shaft 291 a pair of arms 303 positioned just inside the respective frame pieces 166 and 167. The arms 303 extend rearwardly through the comparing unit and support between their far ends a bail rod 304 which underlies all six of the racks 218. Counter-clockwise movement of the shaft 291 (Fig. 15) will, therefore, cause the elevation of the racks 218 to their highest raised position which is one tooth space above the number nine pins 173. Near the end of this upward movement the detent pawls 227 are disabled by the studs 248 on the racks 218 so that as the shaft 291 returns to normal the racks may follow the bail rod 304 until they limit against extended pins 173 to set up the new number. As previously described, the detent pawls 227 are adapted to be held in disabled position by the retaining latches 251. It is evident that all of the latches 251 will not be disabled through the medium of studs 254, since, when setting up a new number, some of the racks 218 will not return to zero. Therefore, a positive actuating means is provided for disabling the retaining latches 251 after the descent of the bail rod 304.

As shown in Fig. 11 and in dot dash outline in Fig. 15 the rearmost end of the right-hand arm 303 normally bears against the forward edge of a plate 305 pivoted to an arm 306 secured to a stud shaft 307 pivotally supported by the frame plate 166. The plate 305 is tensioned to move in a counter-clockwise direction, about its pivot on arm 306, by means of a spring 308 tensioned between a rearward extension of the plate and a stud on the arm. The plate 305 is further connected to the arm 306 by means of a pin and slot arrangement, the spring 308 serving to maintain the rear edge of a slot in plate 305 in contact with a pin on the arm 306. Thus it will be seen that as the arms 303 begin to move upwardly the plate 305 will be cammed rearwardly, against the tension of its spring 308 and that as the arms continue their upward travel the pressure exerted on plate 305 will be relieved and the plate will snap back to its original position. Then on the return stroke of the arms 303, and shortly before they are completely restored to normal, the rearmost end of the right-hand arm 303 will contact the upper edge of the plate 305 to cam the plate 305 the arm 306 and the stud shaft 307, to which the arm is secured, all in a counter-clockwise direction (Fig. 15). Continued downward movement of the arms 303 will release the plate 305 and permit the assembly of which it is a part to return to normal. Referring to Figs. 11, 12 there is secured to the right-hand end of the shaft 307 a lever 309. As viewed therein, counter-clockwise motion of the shaft 307 is performed against the tension of a spring 311 and serves to lower a link 312 connecting the lever 309 and an arm 313 fast on the shaft 252, to which the retaining latches 251 are pivoted. The lowering of link 312 serves to rock the shaft 252 in a counter-clockwise direction. As shown in Figs. 11 and 15 there is secured to the shaft 252 a pair of arms 314 positioned just inside the respective frame plates 166 and 167. Supported between the pair of arms 314 is a bail rod 315 positioned just to the rear of the retaining latches 251. Counter-clockwise movement of the shaft 252, therefore, will be imparted through the arms 314 and bail rod 315 to the latches 251 to disable the latches and permit the detent pawls 227 to engage their respective racks 218.

Returning now to the means for shifting the plate 295 during total strokes it will be seen (Fig. 12) that the plate is formed with an upwardly extending arm to which is connected a link 316 resiliently connected at its other end to the lower end of an arm 317 secured to the right-hand end of a shaft 318. The shaft 318 extends through the plates 166 and 167 (see Figs. 11 and 23) and its left-hand end is coupled to a shaft 319 loosely supported at its opposite end, in a manner noted below, by the previously mentioned stud 121a (see Fig. 5a). As shown in Figs. 5, 5a, 8, and 26 the previously mentioned lever 116 which is adapted to operate the total link 118, is also connected to another link 321 connected at its upper end to an arm 322 fast on the extreme left-hand end of shaft 319. As shown in Fig. 5a the hub on arm 322 is pinned to the shaft 319 and also rests on the outer end of the stud 121a thereby providing a support for the shaft 319. The operation of lever 116, therefore, will not only pull the total link 118 to cause a total to be taken from the accumulators, but will also rock the shaft 319 in a counter-clockwise direction (Fig. 5) which, through the shaft 318, arm 317 and the link 316, will shift the plate 295 rearwardly to condition the machine for a new number set up on the racks 218. The shaft 318 is rocked early in the total cycle but the link 316 may not shift the plate 295 until the plate reaches its extreme lowered position. It is understood that the shaft 318 remains rocked for the duration of the total cycle.

MEANS FOR MANUALLY SETTING RACKS 218

As shown in Figs. 11 and 15 the previously mentioned arms 220, one of which is secured to the upper end of each rack 218, extend downwardly and forwardly in front of the comparing unit and are guided in a slotted bracket 230 secured to the frames 166 and 167. The forward ends of the arms 220 extend through the guide plate 230 and are easily accessible to permit manual control in order that the racks may be pre-set to any desired setting, the bracket 230 being suitably inscribed with six columns of figures from zero to nine. Thus, if for any reason the machine is stopped while sensing in sequence and the racks 218 disarranged, the racks may be set manually to their correct position before the machine is again started. The above manual control also makes it possible, when beginning a run of cards, to preset the racks in accordance with the serial number of the first card to be sensed thereby rendering unnecessary and preventing a total taking operation immediately after the machine is started.

CARD COUNT BLOCK DISABLING MEANS

As mentioned earlier in the description the card count block 132 (see Fig. 3) is adapted to remain elevated to enter a "one" into the Last number unit once for every machine cycle except the idle cycle preceding a total, the total cycle itself and the cycle immediately following a total. Referring now to Figs. 4 and 9 it will be recalled that the block 132 is normally held upward by a latch 151 engaging a finger 148 on the translator shaft 136. A spring 152 tends to hold the latch 151 in engaging position while a forwardly extending link 153 is connected to the latch 151 in order that the latch may be disabled during the period stated above. The link 153 (Fig. 12) is loosely supported near its forward end by the frame of the translator and has its extreme front end bent over in the form of a lug 153A. Positioned directly in front of the lug 153A are the respective upper and lower ends of a pair of arms 323 and 324 secured to the respective shafts 208 and 318. As shown in Fig. 12 the arm 323 on the shaft 208 is bearing against the lug 153A, whereas the arm 324 on the shaft 318 is positioned slightly to the front of the lug. It will be recalled, however, that during sequential verification work the shaft 208 is normally held rocked in a counter-clockwise direction by means of the special control pin 165A. Thus, the arm 323 is normally held in approximately the same position as arm 324 while the link 153 and its lug 153A are caused to bear against both arms by means of the spring 152.

While the link 153 occupies the above position, the latch 151 is free to engage the arm 148 to hold the card count block 132 elevated. If, however, the link 153 is caused to move rearwardly by either arm 323 or 324 the result will be to disable the lach 151 thereby permitting the block 132 to drop to ineffective position. The arm 323 is permitted to operate the link 153 at the beginning of the above mentioned idle cycle due to the retraction of the locking slides 29 which cause all of the wires in the translator to drop from elevated position. Then, at the beginning of the total cycle the arm 324 is rocked rearwardly to retain the link 153 in disabled position during the total cycle. This is necessary due to the fact that the translator wires will rise and fall briefly during the total cycle so that, unless the arm 324 is provided, the latch 151 may effectively engage the arm 148 for a short time during this cycle. Referring now to Figs. 3 and 4 a means is provided for disabling the lever 141 during total cycles. The previously mentioned stud 147 on the lever 141 extends through a slot cut in the rearmost end of a link 325 connected at its forward end to an arm 326 secured to the total shaft 99. The rocking of the shaft 99, therefore, will move the link 325 rearwardly to prevent the operation of lever 141 by the cam 138. The link 325 will remain operated throughout the total cycle. As described in the timing diagram to follow, the depression 139 reaches cooperative relation with the roller on lever 141 at a point near the end of each machine cycle. Thus when the link 325 returns to normal, the depression 139 has just passed beyond the roller on lever 141 and the lever will not be permitted to operate until late in the following cycle. It is during this cycle that the new number is accumulated in the Last number unit and set up on the racks 218.

DISABLING MEANS FOR COMPARING UNIT

An important feature of the present machine is the ease with which the sequence verifying mechanism may be disabled in order to permit the machine to be used for regular adding and listing work. In the present machine the comparing mechanism may be completely disabled merely by replacing the translator described herein with one of a different construction. As shown in Figs. 6 and 9 there is secured to the right-hand front surface of the present translator a forwardly extending bracket 327 adapted to bear against, and hold rocked, a lever 328 pivoted at its mid-point to the previously mentioned shaft 175. The lower end of the lever 328 bears a stud 329 which extends through a slot cut in a lever 331 (as is best shown in Fig. 12) secured to a sleeve loosely mounted on a stud 332 integral with the frame member 166. A spring 333 tensioned between the stud 329 and a stud on the frame 166 tends to urge the lever 328 in a clockwise direction and serves to maintain the lever in contact with the bracket 327. Also secured to the sleeve, surmounting stud 332, is an arm 334 projecting forwardly and rearwardly from its pivot point. With the lever 331 and arm 334 positioned as shown in Figs. 9 and 12 the comparing and total tripping operations may proceed in the manner previously described. If, however, the translator is removed, the pressure exerted on lever 328 by bracket 327 will be relieved and the lever will pivot in a clockwise direction (Fig. 12) under the influence of spring 333. Clockwise motion of the lever 328 serves to rotate the assembly comprising lever 331 and arm 334 in a counter-clockwise direction until the upper end of the arm 334 limits against a stud 335 on the previously mentioned arm 176 associated with the pin box reciprocating mechanism. The next time the arm 176 is raised to move the pin box 169 forwardly, the assembly 131 and 134 continues its counter-clockwise motion until it occupies the position shown in Fig. 27 with the uppermost edge of arm 334 positioned beneath the stud 335. As further illustrated in Fig. 27, the lever 331 has a stud 336 formed on its forward end, adapted, when the lever is rocked, to lie directly in the rear of the link 296, thereby preventing the link and its associated plate 295 from being shifted rearwardly during total strokes. Positioned on the forward end of the arm 334 is a stud 337 adapted to move beneath a shoulder plate 338 (see Fig. 9) secured to the link 242 in order to prevent the operation of the pawl feeding mechanism associated with this link. Thus, unless a translator bearing a projection 327 is in the machine, the means for reciprocating the pin box 169, the means for elevating the racks 218 on the first cycle following a total, and the means for individually feeding the racks 218, will all be disabled.

DESIGNATION AND LINE-SPACE-MECHANISM

In the present machine it is desired to so regulate the printing mechanism of the several units that printing may be effected in the First number unit only on the first machine cycle following a total, and that printing may be effected in the other two units "Total" and "Last number" only during total taking cycles. In order that each group of sequentially numbered cards may be recorded on one line of the report sheet, line space mechanism is provided which may be set to operate only on totals. The designation and line space mechanisms used herein for the above purpose are old and well known in the Powers machine and have been described in my previous application S. N. 156,304.

45-Column Modification

The comparing unit disclosed herein has been described as operating in conjunction with a ninety-column Powers type tabulator. The unit may, however, be mounted on a forty-five-column machine without a change in the unit itself. The decoding pin box 169, as shown in Fig. 14, must, however, be replaced by one of a different construction, preferably of the type shown in Figs. 28, 29, and 30. As shown therein, the pins 173 are arranged in six columns of ten pins to the column and operate to set up the racks 218 in the same manner as the pins in the ninety-column box. The pins 173 are themselves operated by pins 165 (Fig. 10) identical in number and arrangement to the pins 173. It is understood that in a forty-five-column machine the translator used therein will have ten wires to a column instead of the six required for ninety-column work and that the translator pin box must have ten pins to each column. As shown in Fig. 28, the extrusions on the odd numbered pins 173 extend in one direction while the extrusions on the even numbered pins extend in the opposite direction. Cooperating with each set of extrusions are identical locking slides 339 adapted to retain their associated pins 173 in extended position. Only one pin 173 per column will be operated at one time. While in the modification shown, there are two locking slides provided for each column of pins 165, it should be understood that this has been done merely as a mechanical expedient, to insure a rigid construction, and that a single slide per column could be used, if desired.

Timing Diagram

Referring now to Figs. 32 and 33, the timing of certain operating mechanisms of the machine is diagrammatically shown therein with respect to the movement of the main cam shafts 2 and 3. The machine has been timed through four complete and successive machine cycles. These cycles are illustrated in the order in which they occur and are as follows: Add, or Normal, Idle, Total, and Normal. The idle cycle is the usual space or blank stroke which always precedes a total.

Add Cycle

Considering first the Add cycle (Fig. 32) it will be seen that the record card begins its travel out of the storage magazine at 60° of rotation of the drive shaft 2 and reaches full reading position at 226°, at which time it is limiting against the card stop 18 (Fig. 5). The card remains in reading position for the duration of the cycle. The card stop 18 is normally closed and begins to open at 113½° of this cycle to permit the ejection of the card sensed on the preceding cycle. The stop is fully open at 131½° and remains so until 193½°, when it starts to close. The card stop is fully closed at 211½°. The retraction of the locking slides 29 is normally a short intermittent operation beginning at 334° and ending at 360°. The lower pin box 21 (Fig. 2) is reciprocated vertically once for each cycle of the machine. The box is normally up and under the control of eccentric disc 22 will descend until 180° at which time it immediately starts up again, reaching its extreme elevated position at 360°. The translator wires 37 and 43 reach their operative elevated position at 340° of one cycle and normally begin to descend at about 334° of the next cycle. The sector rock shaft 72 (Fig. 4) moves in a reciprocal rocking motion under the control of the cam 68 on the shaft 3. During the first 180° of movement of the shaft 3, the rock shaft 72 moves in a clockwise direction (Fig. 4) to release the sectors 48 and 51 and to operate the hammer release shaft 77. During the second 180° of movement of shaft 3, the shaft 72 rocks in the opposite direction to permit the restoration of the sectors and the hammer release mechanism to normal. The sectors reach their zero printing position at 70° of the cyle, at which time they may be prevented from further movement by upraised zero stops 49 (Fig. 3) or may continue to move forward if their associated zero stops have been depressed.

The decoding pin box 169 (Figs. 12, 14, and 16) is at its extreme rearward position, against the translator pins 165, at 0°. The box starts forward at 0° under the control of its cam 182 and reaches the racks 218 at 20° where it dwells until 340°. At 340° the pin box starts rearwardly, reaching the translator at 355°, to enable its pins 173 to be operated by the extended translator pins 165. The locking slides 186, 192, and 194 of the decoding pin box 169 are retracted once for each machine cycle. Under the control of cam 215 (Fig. 21) the slides begin to retract at 226° and are fully retracted at 246°. They then dwell in retracted position until 345°, when they start to restore to normal. At 360° the slides 186, 192 and 194 are in normal locking position. The advancement of racks 218 by operating member 236 (Fig. 24), through the medium of cam 244, begins at 260° of each cycle and ends at 320° the rack being advanced one tooth between 286° and 292°. The comparing mechanism for determining the relative arrangement of the plates 224 and pins 183 operates under the control of cam 276 (Fig. 25). The comparing or feeling operation begins at 22°, ends at 46°, and the feeler links 257 are restored to normal at 72°. It will be noted that in the Add cycle illustrated herein the machine is "in sequence," that is the parallel links 257 are prevented from moving rearwardly by the pressure of extended plates 224 even though they are released for operation by the cam 276. The comparing mechanism remains in its normal position, therefore, and the cam 276 may be considered to be ineffective. The card count block 132 (Fig. 3) is up throughout a normal Add cycle.

Idle Cycle

Considering now the Idle cycle, it will be remembered that the comparing operation begins at 22° of the cycle. Assume now that on the cycle immediately following the one described above the plates 224 and pins 173 are not identically arranged. Thus, at about 32° of this cycle a total will be tripped and very shortly thereafter, the total control unit is fed one step, thereby instituting an idle machine cycle. The time of advancement of the total control unit is not shown herein, but occurs at approximately 54° which is later than the standard practice in tabulators of the Powers type. As described in the above mentioned Lasker Patent No. 2,237,908 as soon as the machine enters into the Idle cycle, the card feed mechanism is disabled, the card stop is held in closed position and the retract bail is operated at 85° to release the locked intermediate pins 26 and the translator wires 37 and 43. Thus, for the duration of the Idle cycle the card which tripped the total is held in the sensing chamber in reading position and at about 60° all of the translator wires wil start to drop down out of operating position. At 110° the wires are completely down and will remain so until 290° when they again begin to rise as the lower pin box moves towards its elevated position. At 340° the wires are entirely up again but inasmuch as the locking slides 29 are still retracted the wires will descend with the lower pin box at 20° of the next cycle. As the translator wires descend shortly after the start of the Idle cycle, the retaining means for holding the card count block 132 elevated is disabled so that from 65° to 75° of this cycle the block descends to normal position. The block remains down until 320° of this cycle when it starts upward again under the control of cam 138. At 350° the block is entirely up but returns immediately to lowered position since its latch 151 is at this time disabled by link 153. The zero stops 49 are all elevated during the Idle cycle, thereby retaining the sectors 48 and 51 at zero.

TOTAL CYCLE
(Fig. 33)

The mechanism, previously mentioned for retaining the card in reading position and for holding the locking slides 29 retracted throughout the Idle cycle, is also effective throughout a major portion of the Total cycle. The card stop is held closed for the duration of the Total cycle while the locking slides 29 are permitted to resume their engaging position at 350° of this cycle to permit a positive accumulation and printing of the first card of a new group. The translator wires, as mentioned above, descend with the lower pin box at 20° of the Total cycle. At 290° of the cycle they start up again and shortly after reaching operative position are locked therein by the slides 29. The decoding pin box 169 operates near the end of the Total cycle to receive the set-up of the new number from the pins 165. Advancement of racks 218 by cam 244 takes place during both Idle and Total strokes, but serves no purpose since the machine is going through a total taking operation. A comparing operation also takes place during the Total cycle, and the mechanism attempts to trip a second total. However, this motion is ineffective since at the time this operation takes place, the position of the total feed cam 102 (Fig. 7) is such as to prevent the descent of the push rod 104 so that the ratchet wheel 109 may not be operated a second time. The card count block 132 remains down throughout the Total cycle. The T link 118 (Figs. 5 and 8) is pulled by the cam 115 at 345° of the Idle cycle and remains in operated position until 350° of the Total cycle. The racks 218 begin to move upward under the actuation of bail rod 304 (Fig. 26) at 300° of the Total cycle and reach their highest elevated position at 350° at which point they dwell for a short period.

NORMAL CYCLE

At the end of the total cycle all of the disabling mechanisms controlled by the automatic total control unit are normalized and resume operations under their regular controls. The card which tripped the total was positively sensed at the end of the total cycle and this card begins to leave the sensing chamber at 124° of the normal cycle. The translator wires are up throughout the cycle and the decoding pin box reaches its forward position at 20° of the normal cycle. At approximately 10° of this cycle, the rack 218 begins to descend and from that point until 235° of the cycle, the several racks stop off at the set-up pins 173. In a manner previously described, the comparing mechanism is prevented from operating during this cycle. The card count block 132 remains down during this cycle in order that the new number may be accumulated in the last number unit. The rack feeding and slide retract mechanisms operate effectively during this cycle to condition the unit for the second cycle of the new group.

While there is above described but one embodiment of the invention, it is possible to produce still other embodiments without departure from the inventive concept above disclosed, and it is, therefore, desired that only such limitations shall be imposed on the appended claims as are stated therein.

What I claim as new, and desire to secure by Letters Patent, is:

1. In a tabulating machine having record sensing means and total taking control mechanism, the combination of a series of settable number comparing racks of successive denominational orders, means operated by said total taking control mechanism for moving all of said racks to a predetermined position, means controlled by said record sensing means and cooperating with said racks for selectively positioning said racks as they move from their predetermined positions whereby their positions represent a record number, and means associated with said racks and operated once each normal cycle for changing by one the number representation of the racks whereby the racks will be set to represent the numbers of successive record cards.

2. In a tabulating machine having record sensing means, and total taking control mechanism, the combination of a movable link, means tending to move it to initiate an operation of said total taking control mechanism, means for restraining the movement of said link, means operated once each machine cycle for disabling said restraining means, normally effective means for blocking the operation of said movable link, a separate normally ineffective means for blocking the operation of said movable link, record controlled means responsive to said record sensing means for disabling said first mentioned blocking means, and means under the control of said total taking control mechanism for making effective said separate normally ineffective blocking means.

3. In a tabulating machine controlled by groups of record cards, each card bearing a serial number representation, said cards being arranged in consecutive order, a card sensing device, an accumulator, actuators therefor, a total taking control mechanism adapted to control the machine through an idle and a total taking cycle, means to initiate the operation of the total taking control mechanism, a constantly rotating shaft, a cam on said shaft, a card count block, means operated by said cam tending to raise said block once each machine cycle, a latch effective normally to automatically hold the block raised when first elevated, spring-pressed means normally urged to disable said latch, record controlled means responsive to said record sensing means to engage and hold said spring-pressed means in an inoperative position against the urging of the spring, means controlled by the total taking control mechanism to disable said last mentioned means during the idle machine cycle whereby said spring-pressed means is permitted to move to disabling position, and a separate means controlled by the total taking control mechanism and effective when moved thereby to disable the latching means during the total cycle.

4. In a machine of the class described adapted to operate on serially numbered record cards, having a total taking control mechanism and record sensing means, the combination of a number-representing device settable under the control of said record sensing means, a second number-representing device settable under the control of the first number-representing device to the number of the first card of a group, means under control of said total taking control mechanism for causing said second number-representing device to be set under control of the first number-representing device, cyclically operated means to change the setting of said second number-representing device by one unit each cycle, means periodically moved each cycle for initiating an operation of said total taking control mechanism, and means on the second number-representing device and operated by the first number-representing device to block the operation of the initiating means when the settings of the two number-representing devices correspond.

5. In a machine of the class described adapted to operate on serially numbered record cards, having a total taking control mechanism and record sensing means, the combination of a number-representing device settable under the control of said record sensing means, a second number-representing device settable under the control of the first number-representing device to the number of the first card of a group, means under control of said total taking control mechanism for causing said second number-representing device to be set under control of the first number-representing device, cyclically operated means to change the setting of said second number-representing device by one unit each cycle, stop-plates on the second number-representing device and operated by the first number-representing device, a comparing device moved each cycle toward said stop-plates, said plates blocking the operation of the comparing device when the settings of the two number-representing devices correspond, and means operated by said comparing device, when its movement is not blocked, to initiate operation of the total-taking control mechanism.

6. In a machine of the class described adapted to operate on serially numbered record cards, having a total taking control mechanism and a record sensing means, a translator pin box including a plurality of pins settable each cycle under control of the record sensing means, a decoding pin box including a plurality of settable pins, a plurality of racks settable under the control of the decoding pin box, means under control of said total taking control mechanism for causing said racks to be set under control of the decoding pin box to represent the number of the first card of a group, cyclically operated means to change the setting of the racks by one unit each cycle, means for moving said decoding pin box cyclically into association with the pins of the translator pin box so as to be set to represent successive card numbers, said moving means thereafter moving the decoding pin box into association with said racks, stop plates on the racks and movable into blocking position by the pins on the decoding pin box and comparing means moved cyclically toward said stop plates, said stop plates blocking the operation of the comparing means when the settings of the racks and the pins on the decoding pin box correspond, and means operated by said comparing device, when its movement is not blocked, to initiate operation of the total taking control mechanism.

JOSEPH M. McDONNELL.

Certificate of Correction

Patent No. 2,280,924.                                                                April 28, 1942

Joseph M. McDonnell

It is hereby certified that error appears in the printed specification of the above numbered patent requiring correction as follows:

Page 4, first column, line 37, for "(not shown)" read (*one shown*); page 5, second column, line 31, for "names" read *means*; page 10, second column, line 51, for "rack" read *racks 218*; page 11, first column, line 22, for "rack" read *racks*; page 14, first column, line 36, for "lach" read *latch*; page 15, second column, line 42, for "at 72°" read *by 72°*;

and that the said Letters Patent should be read as corrected above.

Signed and sealed this 16th day of November, A. D. 1954.

[SEAL]

ARTHUR W. CROCKER,
*Assistant Commissioner of Patents.*